US012077301B1

(12) United States Patent
Newbauer et al.

(10) Patent No.: US 12,077,301 B1
(45) Date of Patent: *Sep. 3, 2024

(54) GALLEY LIFT

(71) Applicant: Delta Air Lines, Inc., Atlanta, GA (US)

(72) Inventors: Michael Lee Newbauer, Woodbury, MN (US); Galen James Meyers, Rosemount, MN (US)

(73) Assignee: Delta Air Lines, Inc., Atlanta, GA (US)

( * ) Notice: Subject to any disclaimer, the term of this patent is extended or adjusted under 35 U.S.C. 154(b) by 131 days.

This patent is subject to a terminal disclaimer.

(21) Appl. No.: 17/965,842

(22) Filed: Oct. 14, 2022

Related U.S. Application Data

(63) Continuation of application No. 16/815,201, filed on Mar. 11, 2020, now Pat. No. 11,472,557.

(60) Provisional application No. 62/976,023, filed on Feb. 13, 2020.

(51) Int. Cl.
 B64D 11/04 (2006.01)
 B64F 5/40 (2017.01)
 B66F 5/04 (2006.01)
 B62B 3/06 (2006.01)

(52) U.S. Cl.
 CPC ........... B64D 11/04 (2013.01); B64F 5/40 (2017.01); B66F 5/04 (2013.01); B62B 3/0618 (2013.01); B62B 2203/10 (2013.01)

(58) Field of Classification Search
 CPC ... B64D 11/04; B64F 5/40; B66F 5/04; B62B 3/0618; B62B 2203/10
 See application file for complete search history.

(56) References Cited

U.S. PATENT DOCUMENTS

| 1,981,680 | A | * | 11/1934 | Tindale | B66F 9/02 |
| | | | | | 108/147 |
| 2,050,000 | A | * | 8/1936 | Frost | B66F 13/00 |
| | | | | | 254/2 R |
| 2,998,960 | A | * | 9/1961 | Smith | B66F 7/04 |
| | | | | | 254/133 R |
| 4,331,324 | A | * | 5/1982 | Andary | B66F 7/0633 |
| | | | | | 254/2 R |
| 4,491,452 | A | * | 1/1985 | Matovich | B60B 29/002 |
| | | | | | 414/427 |
| 4,690,605 | A | | 9/1987 | Coccaro | |
| 4,723,756 | A | * | 2/1988 | Stumpf, Jr. | F16M 11/18 |
| | | | | | 254/93 H |

(Continued)

FOREIGN PATENT DOCUMENTS

EP  3305661 A1 * 4/2018 ............. B64D 11/00

OTHER PUBLICATIONS

"Galley Assist Lift 'GAL'," Delta TechOps, retrieved at https://s3.amazonaws.com/amz.xcdsystem.com/A464CFFD-AD60-6FDF-891D286CD09FD636_abstract_File10853/BoothHandout_31_0213083537.pdf on Mar. 3, 2020.

(Continued)

Primary Examiner — Assres H Woldemaryam
(74) Attorney, Agent, or Firm — Hartman & Citrin LLC

(57) ABSTRACT

Concepts and technologies are disclosed herein for a galley lift. In one embodiment, the galley lift includes an upper portion and a lower portion. The upper portion can have a lift platform and a lift platform ram extension. The lower portion can have a lift mechanism and a ram. In some embodiments, the lift platform ram extension is attached to the ram.

20 Claims, 11 Drawing Sheets

(56) References Cited

U.S. PATENT DOCUMENTS

| | | | | |
|---|---|---|---|---|
| 4,934,893 A * | 6/1990 | Johnson | ................ | B62B 3/06 414/812 |
| 5,110,090 A | 5/1992 | McDuffie | | |
| 5,135,350 A * | 8/1992 | Eelman | ................ | A61G 1/0212 5/81.1 R |
| 5,163,806 A * | 11/1992 | Robertson | ................ | B66F 7/065 414/800 |
| 5,378,105 A * | 1/1995 | Palko | ................ | B60P 1/44 410/67 |
| 5,430,924 A * | 7/1995 | Rose | ................ | B66F 7/18 254/2 R |
| 5,655,734 A * | 8/1997 | Dahl | ................ | B66F 7/0625 414/495 |
| 6,322,062 B1 * | 11/2001 | Conn | ................ | A47B 96/00 269/69 |
| 6,485,247 B1 | 11/2002 | Groves et al. | | |
| 6,663,043 B1 * | 12/2003 | Luria | ................ | B66C 1/663 244/118.1 |
| 8,348,238 B2 * | 1/2013 | Anderson | ................ | B66F 3/08 269/21 |
| 9,221,541 B2 * | 12/2015 | Durand | ................ | B64D 11/0007 |
| 9,434,484 B2 * | 9/2016 | Umlauft | ................ | B64F 5/10 |
| 11,084,695 B2 | 8/2021 | Holman | | |
| 2017/0198858 A1 * | 7/2017 | Bruchal | ................ | H05K 7/18 |
| 2020/0231079 A1 * | 7/2020 | Lai | ................ | B62B 3/02 |

OTHER PUBLICATIONS

Ergo Cup competition, 23$^{rd}$ Annual Applied Ergonomics Conference 2020, Mar. 16-19, 2020, p. 17, retrieved at https://www.iise.org/uploadedFiles/IIE/Community/Technical_Societies_and_Divisions/Applied_Ergonomics_division/2020AEC_EC_TeamDesc_011120.pdf on Mar. 6, 2020.

U.S. Notice of Allowance mailed on Jun. 3, 2022 in U.S. Appl. No. 16/815,201.

* cited by examiner

GALLEY LIFT

This application is a continuation of and claims priority to U.S. patent application Ser. No. 16/815,201, entitled "Galley Lift," filed Mar. 11, 2020, now U.S. Pat. No. 11,472,557, which is incorporated herein by reference in its entirety, and which is a nonprovisional of and claims priority to U.S. Provisional Patent Application No. 62/976,023, entitled "Galley Lift," filed Feb. 13, 2020, which is incorporated herein by reference in its entirety.

TECHNICAL FIELD

The present disclosure relates generally to aircraft. More particularly, the present disclosure relates to a galley lift that can be used during the manufacturing, maintenance, and/or operation of an aircraft.

BACKGROUND

Unless otherwise indicated herein, all disclosures in the background are not prior art to the claims in this application and are not admitted to be prior art by inclusion in this section.

During manufacturing, maintenance, and/or other operations on aircraft, it may sometimes be necessary to move or remove a galley. In some cases, the galley may be connected to or joined to the aircraft using adhesives or other bonding materials, mechanical fasteners, or other materials or structures. In some cases, a bond between the galley and a portion of the aircraft (e.g., an aircraft floor or other structure) may be broken during movement or lifting of the galley. Based on the materials used to create the bond between the galley and the aircraft, it may be possible that breaking the bond between the galley and the aircraft could require a great deal of force.

It is possible, for example, that a force of around two hundred fifty pounds or more may be required to be exerted on a galley to lift the galley out of contact with the aircraft (where this force is required to lift the weight of the galley and to cause a bonding material between the galley and the aircraft to fail). To move the galley within the confines of the aircraft, some manufacturers or maintenance personnel may bend their bodies under the galley and exert a downward force with the legs, thereby pushing the galley up and eventually breaking the bond between the galley and the aircraft if enough force is exerted by the maintenance personnel.

DETAILED DESCRIPTION

Figure 1:
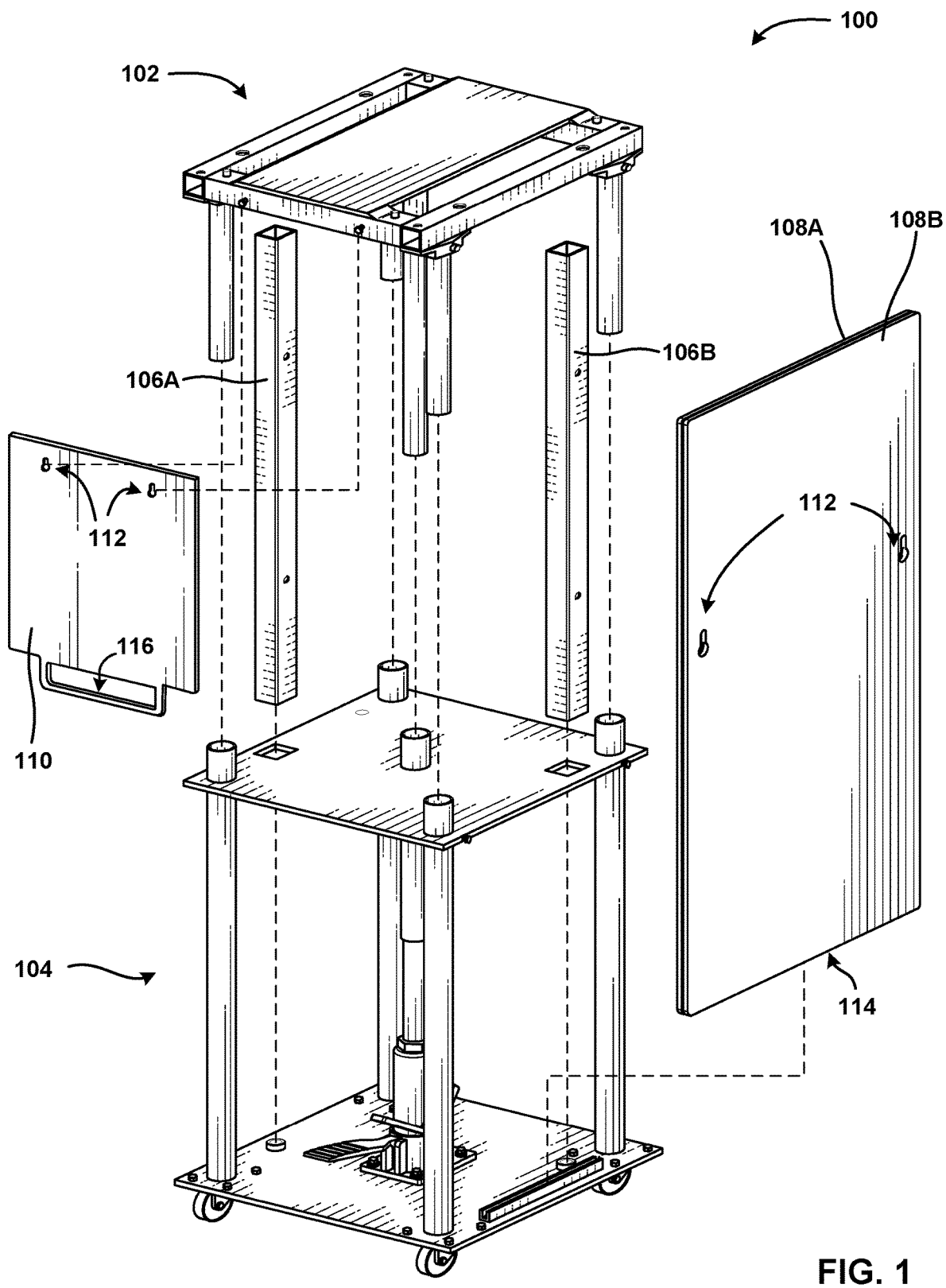
FIG. 1 is a line drawing illustrating an exploded assembly view of a galley lift, according to an illustrative embodiment of the concepts and technologies disclosed herein.

In the following detailed description, references are made to the accompanying drawings that form a part hereof and that show, by way of illustration, specific embodiments or examples. It must be understood that the disclosed embodiments are merely illustrative of the concepts and technologies disclosed herein. The concepts and technologies disclosed herein may be embodied in various and alternative forms, and/or in various combinations of the embodiments disclosed herein. The word "illustrative," as used in the specification, is used expansively to refer to embodiments that serve as an illustration, specimen, model, sample, or pattern.

Additionally, it should be understood that the drawings are not necessarily to scale, and that some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure. Referring now to the drawings, in which like numerals represent like elements throughout the several figures, aspects of a galley lift will be described.

Referring first to FIG. 1, an exploded view of a galley lift 100 will be illustrated and described, according to an illustrative embodiment of the concepts and technologies disclosed herein. As shown in FIG. 1, the illustrated embodiment of the galley lift 100 can be provided in some embodiments by one or more components. In particular, FIG. 1 illustrates an example embodiment of the galley lift 100, where the galley lift 100 can be formed as an assembly of an upper portion 102, a lower portion 104, one or more weight distributors 106A-B (hereinafter collectively and/or generically referred to as "weight distributors 106"), one or more floor support plates 108A-B (hereinafter collectively and/or generically referred to as "floor support plates 108"), one or more galley guide plates 110, and/or other components as illustrated and described herein. While the illustrated embodiment shown in FIG. 1 includes two weight distributors 106, two floor support plates 108, and one galley guide plate 110, it should be understood that this embodiment is illustrative and therefore should not be construed as being limiting in any way.

In some embodiments, such as the embodiment shown in FIG. 1, the upper portion 102 can be assembled with the lower portion 104 to form the galley lift 100. In some embodiments, the galley lift 100 can be disassembled into the upper portion 102 and the lower portion 104. Because the galley lift 100 can be provided in some embodiments by a structure that is not readily assembled from the upper portion 102 and the lower portion 104 and/or that is not readily disassembled into the upper portion 102 and the lower portion 104, it should be understood that the illustrated example is illustrative, and therefore should not be construed as being limiting in any way.

According to various embodiments of the concepts and technologies disclosed herein, a galley lift 100 that can be assembled and/or disassembled as shown in FIG. 1 can provide one or more benefits. For example, in some embodiments, one or more of the upper portion 102 and/or the lower portion 104 can have smaller dimensions than the galley lift 100 when fully assembled from the upper portion 102 and the lower portion 104. As such, the components of the galley lift 100 (e.g., the upper portion 102 and the lower portion 104) can be more compact, weigh less, and/or be easier to transport into and/or through an aircraft than would be the case for an assembled configuration of the galley lift 100, in some embodiments. Additionally, some embodiments of the galley lift 100, when assembled from the upper portion 102 and the lower portion 104, can weigh over thirty pounds. According to various embodiments of the concepts and technologies disclosed herein, however, one or more and/or each of the upper portion 102, the lower portion 104, the weight distributors 106, the floor support plates 108, and/or the galley guide plate 110 can be configured to weigh less than thirty pounds each. It should be understood that this example is illustrative, and therefore should not be construed as being limiting in any way.

Thus, in some embodiments of the concepts and technologies disclosed herein, one or more (and/or each) of the components of the galley lift 100 can weigh less than thirty pounds, less than twenty five pounds, and/or less than other weights (e.g., weights that may be associated with lifting-related injury risks, set by company policy, and/or otherwise determined). Specifically, in some embodiments it may be advisable to avoid a single person lifting a weight over twenty five pounds, and each of the components of the galley lift 100 (e.g., the upper portion 102, the lower portion 104, the weight distributors 106, the floor support plates 108, the galley guide plates 110, and/or other components) can weigh less than twenty five pounds. In some other embodiments, it may be advisable to avoid a single person lifting a weight over thirty pounds, and each of the components of the galley lift 100 (e.g., the upper portion 102, the lower portion 104, the weight distributors 106, the floor support plates 108, the galley guide plates 110, and/or other components) can weigh less than thirty pounds. Thus, the ability to assemble and/or disassemble the galley lift 100 can enable a user or users of the galley lift 100 to reduce or even avoid the risk of lifting-related injuries, in some embodiments. It should be understood that this example is illustrative, and therefore should not be construed as being limiting in any way.

In some embodiments, a user or users of the galley lift 100 can transport the disassembled components of the galley lift 100 (e.g., the upper portion 102, the lower portion 104, the weight distributors 106, the floor support plates 108, the galley guide plates 110, and/or other components) into an aircraft or other use environment. The user or users of the galley lift 100 can assemble the galley lift 100 from the components that were transported into the aircraft or other use environment and use the galley lift 100 for one or more operations. After use, the galley lift 100 can be disassembled into its components (e.g., the upper portion 102, the lower portion 104, the weight distributors 106, the floor support plates 108, the galley guide plates 110, and/or other components) and removed from the aircraft. It can be appreciated that these five operations (transporting the components of the galley lift 100 into an aircraft, assembling the galley lift 100 from the components, using the galley lift 100, disassembling the galley lift 100 into its components, and transporting the components of the galley lift 100 out of the aircraft) can all occur without any user carrying more than twenty five pounds in some embodiments, thirty pounds in some other embodiments, or other weights in yet other embodiments. It should be understood that this example is illustrative, and therefore should not be construed as being limiting in any way.

Figure 2:
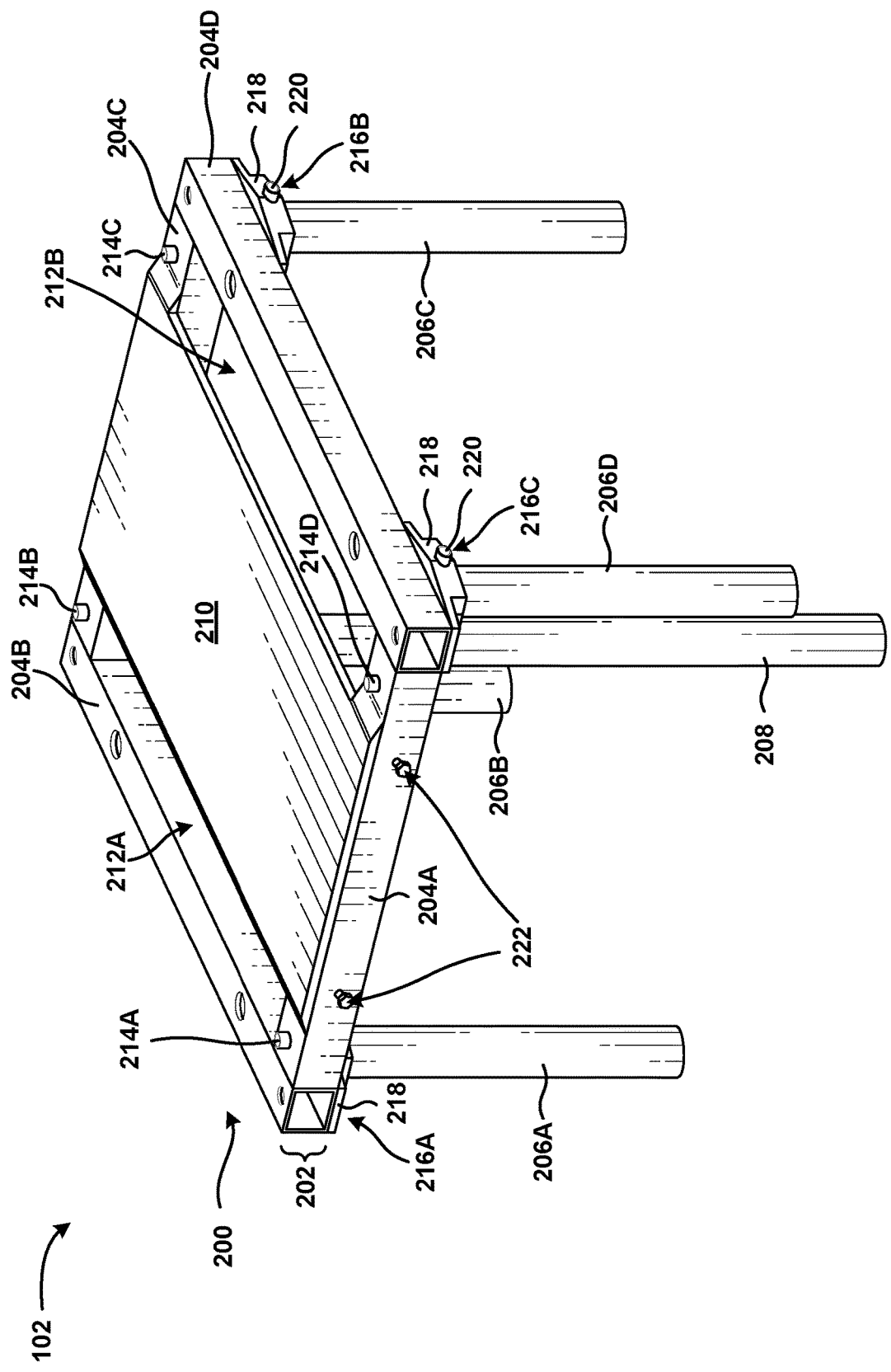
FIG. 2 is a line drawing illustrating a top portion of a galley lift, according to an illustrative embodiment of the concepts and technologies disclosed herein.

Turning now to FIG. 2, various components of the upper portion 102 will be illustrated and described in detail. The upper portion 102 can include a lift platform 200. The lift platform 200 can correspond to a top surface or layer of the upper portion 102. The lift platform 200 can include a surface or structure that can be configured to engage a portion of a galley or a galley component (not shown in FIG. 2) or another structure or component that is to be lifted or engaged by the galley lift 100. This will be explained in more detail below, particularly with reference to FIG. 8.

According to various embodiments of the concepts and technologies disclosed herein, the lift platform 200 can be provided at least partially by a frame or other structure that can be formed from one or more components, referred to herein as a lift platform frame 202. In the illustrated embodiment, the lift platform frame 202 can be provided by four frame members 204A-D (hereinafter collectively and/or generically referred to as "frame members 204"). While the frame members 204 are given the same reference numeral and are illustrated in FIG. 2 as being substantially similar to one another in terms of dimensions and/or configurations, it should be understood that the frame members 204 need not be identical to one another and/or that the frame members 204 can have various configurations. As such, the illustrated embodiment should be understood as being illustrative and should not be construed as being limiting in any way.

According to various embodiments of the concepts and technologies disclosed herein, the frame members 204 can be attached and/or connected to one another to form the lift platform frame 202. In some embodiments, the frame members 204 can be welded to one another and/or to another surface or structure. For example, if the frame members 204 are formed from aluminum, the frame members 204 can be welded to one another (or to another surface or structure) using a welding process such as, for example, a gas-metal-arc-welding ("GMAW") process such as metal inert gas ("MIG") welding or metal active gas ("MAG") welding; gas tungsten arc welding ("GTAW") processes such as tungsten inert gas ("TIG") welding; and/or other welding processes. In some other embodiments, the frame members 204 can be formed from steel and can be welded and/or spot welded together, if desired. In some other embodiments, the frame members 204 can be connected to one another using connection mechanisms such as, for example, screws, bolts, rivets, and/or other devices and/or structures. In yet other embodiments, the frame members 204 can be joined to one another using adhesives and/or chemical bonding processes. Because the frame members 204 can be joined to one another (and/or other surfaces and/or structures) using other materials, processes, chemicals, or the like, it should be understood that these examples are illustrative, and therefore should not be construed as being limiting in any way.

In the illustrated embodiment shown in FIG. 2, the frame members 204 can be formed from extruded aluminum, and the frame members 204 can be joined together using a welding process such as one or more of the welding processes mentioned above. Because the frame members 204 can be joined, connected, and/or attached to one another in various manners in addition to, and/or instead of, welding, and because the frame members 204 can be formed from various types of materials (e.g., metals such as aluminum, steel, titanium, and/or various metal alloys; epoxies; one or more carbon composites and/or polymers; wood; other materials; and/or combinations thereof), it should be understood that the illustrated example embodiment formed from aluminum is illustrative, and therefore should not be construed as being limiting in any way.

As shown in FIG. 2, the upper portion 102 also can include one or more lift platform guides 206A-D (hereinafter collectively and/or generically referred to as "lift platform guides 206"). While the illustrated embodiment shows four lift platform guides 206, it should be understood that some embodiments of the galley lift 100 can include one, two, three, four, or more than four lift platform guides 206. In particular, as will be illustrated and described hereinbelow, some contemplated embodiments of the galley lift 100 can include one, two, three, four, and/or more than four lift platform guides 206. As such, the illustrated embodiment of the galley lift 100, which includes four lift platform guides 206, is illustrative and should not be construed as being limiting in any way.

The lift platform guides 206 can be configured such that one or more of the lift platform guides 206 (or a portion thereof) can be inserted into one or more components of the lower portion 104, as will be explained in more detail below after introducing additional components of the upper portion 102. According to various embodiments of the concepts and technologies disclosed herein, the lift platform guides 206 can be configured to maintain the lift platform 200 in a desired configuration during use of the galley lift 100 and/or at other times, to provide rigidity and/or structural integrity and/or support for the galley lift 100 during use and/or at other times, and/or for other purposes. Because the lift platform guides 206 can be provided for other purposes, it should be understood that these example purposes are illustrative, and therefore should not be construed as being limiting in any way.

In some embodiments of the galley lift 100, the upper portion 102 can include one or more lift platform ram extension 208. It should be understood that while the lift platform ram extension 208 is illustrated as a single member, it is possible in some embodiments of the concepts and technologies disclosed herein to use multiple structures to provide the functionality of the lift platform ram extension 208. In some contemplated embodiments, the functionality of the lift platform ram extension 208 can be combined with one of the (or the only) lift platform guides 206. As such, it should be understood that the illustrated example embodiment is illustrative, and therefore should not be construed as being limiting in any way.

The lift platform ram extension 208 can be connected to a ram or other structure associated with a piston, lift, jack, or other device (not visible in FIG. 2). Thus, a lift force can be applied to the lift platform 200 and/or components thereof (e.g., the lift platform frame 202) via the lift platform ram extension 208, in some embodiments. According to various embodiments of the concepts and technologies disclosed herein, and as shown in FIG. 2, the lift platform ram extension 208 can be connected to a lift platform plate 210. In some contemplated embodiments, including the embodiment illustrated in FIG. 2, the lift platform ram extension 208 can be connected to a center of the lift platform 200, though this is not necessarily the case in all embodiments. In some other embodiments, the lift platform frame 202 can include various structures (not visible in FIG. 2) to which the lift platform ram extension 208 can be joined instead of, or in addition to, the lift platform plate 210. Because the lift platform plate 210 is not included in all embodiments of the galley lift 100, it should be understood that this example is illustrative, and therefore should not be construed as being limiting in any way.

According to various embodiments of the concepts and technologies disclosed herein, the lift platform frame 202 can be configured to provide support structure and/or rigidity for the upper portion 102. For example, the lift platform frame 202 can provide an attachment surface or frame for the one or more lift platform guides 206, the lift platform ram extension 208, and/or the lift platform plate 210. As shown in the example embodiment shown in FIG. 2, the lift platform plate 210 can be welded to one or more portions of (e.g., to one or more of the frame members 204) the lift platform frame 202. Because the lift platform plate 210 can be attached to the lift platform frame 202 in additional and/or alternative manners (e.g., using one or more screws, rivets, adhesives, bolts, welds, other structures, other chemicals, other devices, and/or combinations thereof), it should be understood that this example of using welding is illustrative, and therefore should not be construed as being limiting in any way.

In some embodiments, the lift platform plate 210 can be configured and/or sized such that the lift platform plate 210 can be smaller in at least one dimension than the dimensions of the lift platform frame 202. Thus, one or more edges of the lift platform plate 210 can be configured to provide edges of one or more weight distributor slots 212A-B (hereinafter collectively and/or generically referred to as "weight distributor slots 212"). The weight distributor slots 212 are optional in some embodiments. In particular, in some embodiments, the lift platform plate 210 can be extended to cover the lift platform frame 202 and, as such, the weight distributor slots 212 may be omitted in some embodiments of the galley lift 100. Furthermore, it should be understood that the illustrated configuration is illustrative, as the relative size and/or dimensions of the weight distributor slots 212 can vary in various embodiments of the galley lift 100. As such, the illustrated embodiment should be understood as being illustrative and should not be construed as being limiting in any way.

As shown in FIG. 2, the lift platform frame 202 can include one or more weight distributor locators/anchors 214A-D (hereinafter collectively and/or generically referred to as "weight distributor locators/anchors 214" and/or as a "weight distributor locator/anchor 214"). In the illustrated embodiment shown in FIG. 2, the weight distributor locators/anchors 214 are illustrated as being located on the lift platform frame 202 at a location within the weight distributor slots 212. Because one or more of the weight distributor slots 212 can be omitted in some embodiments, it should be understood that one or more of the weight distributor locators/anchors 214 can pass through the lift platform plate 210, can be attached to the lift platform plate 210, and/or can be located on or in other structures of the upper portion 102. Additionally, it should be understood that the location, position, and/or configuration of the weight distributor locators/anchors 214 as illustrated in FIG. 2 is illustrative of only one contemplated embodiment and therefore should be understood as being illustrative and should not be construed as being limiting in any way.

Figure 3:
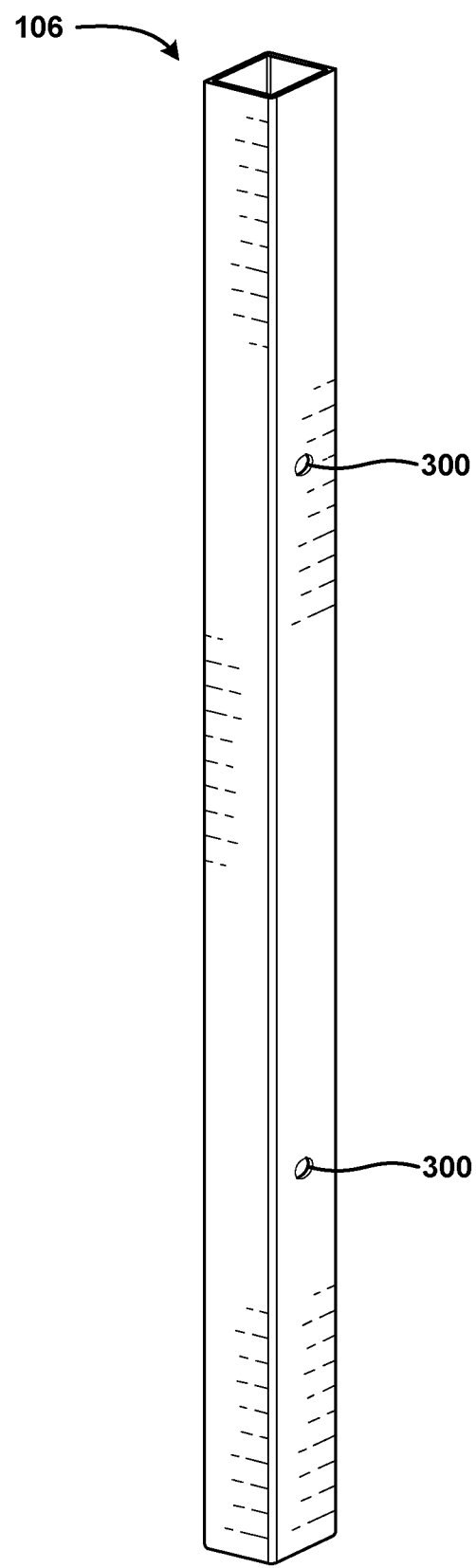
FIG. 3 is a line drawing illustrating a weight distributor for a galley lift, according to an illustrative embodiment of the concepts and technologies disclosed herein.

According to various embodiments of the concepts and technologies disclosed herein, the weight distributor locators/anchors 214 can be configured to engage one or more weight distributor locator/anchor apertures 300A-D (hereinafter collectively and/or generically referred to as "weight distributor locator/anchor apertures 300") that can be formed in the one or more weight distributors 106 (visible in FIG. 1 and labeled with reference numeral 300 in FIG. 3). The weight distributor locators/anchors 214 can be included in some embodiments to assist a user in locating the weight distributors 106 in the weight distributor slots 212 and/or at other locations relative to the upper portion 102. The weight distributor locators/anchors 214 also can be configured to maintain the weight distributors 106 in a desired location, position, and/or configuration (e.g., by preventing sliding, rotation, and/or other movement of the weight distributors 106). In some other embodiments, one or more of the weight distributor locators/anchors 214 can be omitted. As such, it should be understood that the illustrated embodiment one example embodiment of the concepts and technologies disclosed herein and therefore should not be construed as being limiting in any way.

In various embodiments of the concepts and technologies disclosed herein, the functionality of the weight distributor locators/anchors 214 can be provided by one or more projections, bars, bolts, pins, straps, other structures or devices, combinations thereof, or the like. For example, while the weight distributor locators/anchors 214 are shown in the illustrated embodiment as posts that can be configured to engage the weight distributor locator/anchor apertures 300 on the weight distributors 106, the posts can be replaced with belts or other devices that can grasp the weight distributors 106 and/or maintain the weight distributors 106 in a desired configuration.

In one specific contemplated embodiment, the weight distributor locator/anchor apertures 300 on the weight distributors 106 can be replaced with a slot or cut that can be formed in the weight distributors 106, and the posts that function as the weight distributor locators/anchors 214 can be replaced with a strap that passes through the slot or cut, thereby holding the weight distributors 106 in a desired configuration relative to the upper portion 102. Because there are many manners in which the weight distributors 106 can be held and/or maintained in a desired location, position, and/or configuration relative to one or more components of the galley lift 100, and because the weight distributors 106 need not be held and/or maintained in a desired location, position, and/or configuration relative to one or more components of the galley lift 100, it should be understood that the illustrated and described examples are illustrative, and therefore should not be construed as being limiting in any way.

Regardless of the structures, devices, and/or mechanisms used to provide the weight distributor locators/anchors 214 and/or the weight distributor locator/anchor apertures 300, it should be appreciated that these mechanisms, if included in an embodiment of the galley lift 100, can be included in some embodiments to assist in locating and/or maintaining the weight distributors 106 in a desired configuration when a lift force is applied to the upper portion 102 and/or when a weight is applied to the upper portion 102. Thus, the weight distributors 106 can be prevented from sliding and/or moving during lifting, in some embodiments, by inclusion of these mechanisms, structures, and/or devices. Additionally, or alternatively, the weight distributors 106 and/or the weight distributor locator/anchor apertures 300 can be included to distribute a lifting force over an area of a galley structure or other structure being lifted to attempt to avoid damage to the structure being lifted. Because the weight distributors 106 and/or the weight distributor locator/anchor apertures 300 can be included for various additional and/or alternative reasons, it should be understood that the above examples are illustrative, and therefore should not be construed as being limiting in any way.

As shown in the embodiment of the upper portion 102 depicted in FIG. 2, one or more of the lift platform guides 206 can be attached to the lift platform frame 202 and/or other components of the upper portion 102 by way of one or more structures and/or devices. In the illustrated embodiment, one or more of the lift platform guides 206 can be attached to the lift platform frame 202 by way of one or more lift platform guide brackets 216A-C (hereinafter collectively and/or generically referred to as "lift platform guide brackets 216"). In the illustrated embodiment, another lift platform guide bracket 216 can be included near the top of the lift platform guide 206B, but that lift platform guide bracket 216 is not visible in the view shown in FIG. 2 because the lift platform plate 210 and/or other structure of the upper portion 102 is illustrated as obscuring the view of that corner of the upper portion 102. The lift platform guide brackets 216 can be used to attach the lift platform guides 206 to the lift platform frame 202 in some embodiments, while in some other embodiments, the lift platform guides 206 can be welded or otherwise attached directly to the lift platform frame 202 and/or the lift platform plate 210. In some other embodiments, one or more of the lift platform guides 206 can be attached to the lift platform frame 202 and/or other components of the upper portion 102 by way of welding, mechanical attachment mechanisms, adhesives, combinations thereof, or the like. As such, the illustrated embodiment should be understood as being illustrative and should not be construed as being limiting in any way.

In some embodiments, the lift platform ram extension 208 can be attached to the lift platform plate 210 and/or the lift platform frame 202 using a bracket or other connection mechanism that can be similar to or different from the lift platform guide brackets 216, welded to the lift platform plate 210 and/or other structures or components of the upper portion 102, and/or otherwise attached to the lift platform frame 202, the lift platform plate 210, and/or other structures or components of the upper portion 102. As such, it should be understood that the illustrated embodiment is illustrative and should not be construed as being limiting in any way.

As shown in the embodiment illustrated in FIG. 2, one or more of the lift platform guide brackets 216 can include a body 218 and a connection mechanism 220. In the illustrated embodiment of the lift platform guide brackets 216, the body 218 can include a sleeve or void into which the lift platform guides 206 can be inserted. Thus, in some embodiments, the body 218 can be configured as a cylindrically-shaped sleeve or void that can be configured and/or dimensioned to accept a portion of a lift platform guide 206. The connection mechanism 220 can be provided by a screw, a bolt, pin, threading or other structural features, or the like. Thus, a lift platform guide 206 can be inserted into the body 218, and the connection mechanism 220 can be tightened to hold the lift platform guide 206 in position. It should be understood that this example is illustrative, and therefore should not be construed as being limiting in any way.

In some embodiments, the lift platform guide 206 can include an aperture into which the connection mechanism 220 can pass to hold the lift platform guide 206 in position, while in some other embodiments, the connection mechanism 220 can hold the lift platform guide 206 in a desired position and/or configuration via pressure exerted by the connection mechanism 220. Because various configurations for the body 218 and/or the connection mechanism 220 are possible and are contemplated, it should be understood that these examples are illustrative, and therefore should not be construed as being limiting in any way.

Figure 4:
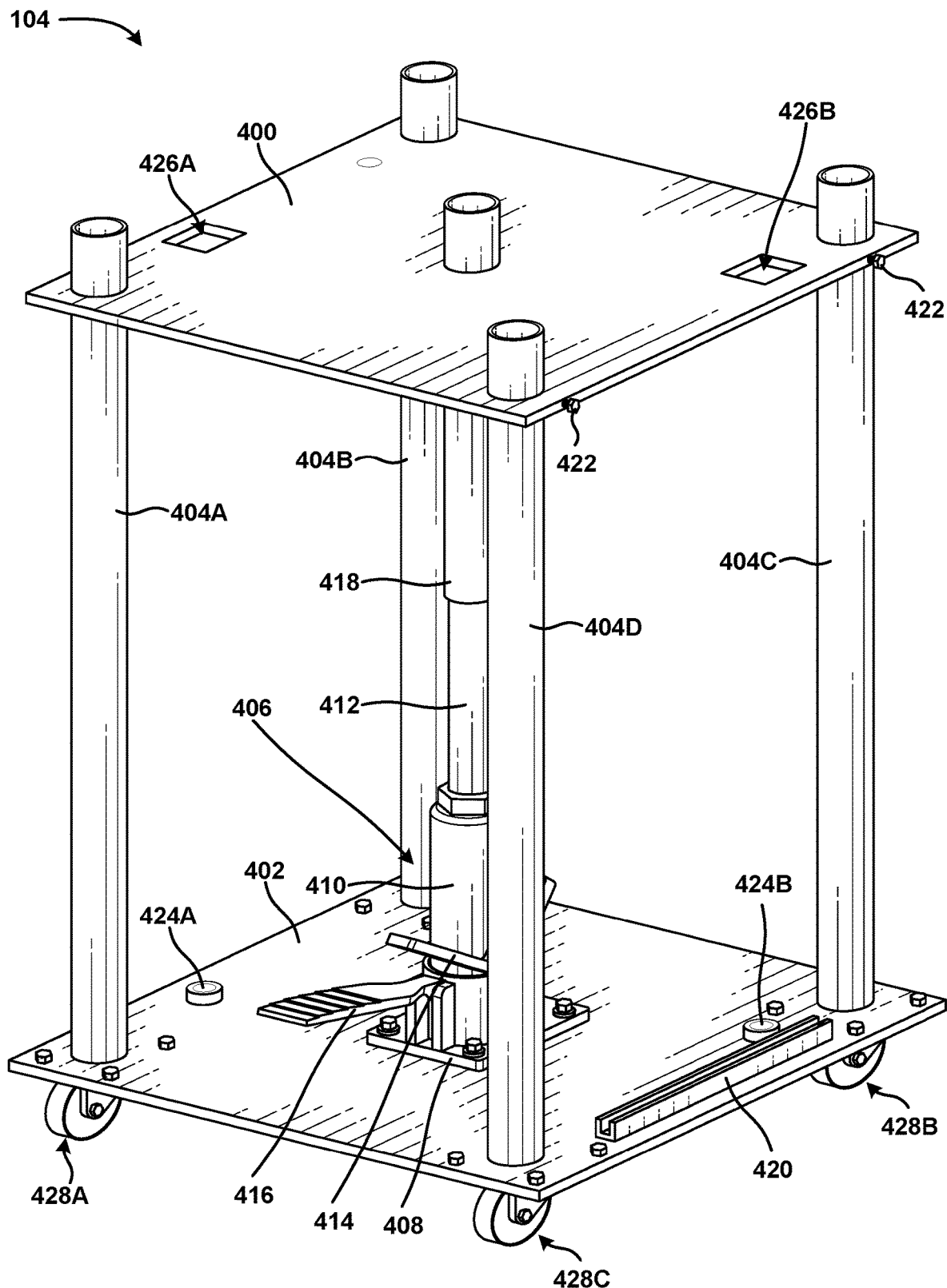
FIG. 4 is a line drawing illustrating a lower portion of a galley lift, according to an illustrative embodiment of the concepts and technologies disclosed herein.

Turning now to FIG. 4, various components of the lower portion 104 will be illustrated and described in detail, according to one example embodiment of the concepts and technologies disclosed herein. According to various embodiments, the lower portion 104 can include a guide plate or guide structure (hereinafter referred to as a "guide") 400 and a base plate or base structure (hereinafter referred to as a "base") 402. The guide 400 can be located in and/or maintained in a desired location and/or configuration by one or more guide supports 404A-D (hereinafter collectively and/or generically referred to as "guide supports 404"). Although the illustrated embodiment shows four guide supports 404, it should be understood that some embodiments of the concepts and technologies disclosed herein can include one, two, three, four, and/or more than four guide supports 404. As such, the illustrated embodiment should be understood as being illustrative of one embodiment and should not be construed as being limiting in any way.

According to various embodiments of the concepts and technologies disclosed herein, the number of guide supports 404 that are included on the lower portion 104 can correspond to the number of lift platform guides 206 that are included on the upper portion 102, though this is not necessarily the case. In particular, in various embodiments of the concepts and technologies disclosed herein, the lift platform guides 206 and/or one or more portions thereof can be inserted into the guide supports 404 and/or one or more portions thereof (as schematically illustrated in FIG. 1) to assemble the galley lift 100. Therefore, the number of lift platform guides 206 can match the number of guide supports 404 in various embodiments, though again this is not necessarily the case in all embodiments. As such, the illustrated embodiment should be understood as being illustrative and should not be construed as being limiting in any way.

The lower portion 104 also can include a hydraulic lift, piston, jack, or other lift mechanism (hereinafter referred to as a "lift mechanism") 406. In some embodiments, as shown in FIG. 4, the lift mechanism 406 can include a mounting plate 408, a piston 410, a ram 412, an actuator 414, and a release 416. Because the lift mechanism 406 can include additional and/or alternative components, it should be understood that the illustrated embodiment is illustrative and should not be construed as being limiting in any way.

According to various embodiments of the concepts and technologies disclosed herein, the lift mechanism 406 can be located on the base 402 such that the lift mechanism 406 (or an actuator 414 thereof) can be operated (or actuated) by a user using a foot. In some embodiments of the galley lift 100, this configuration can enable a user to operate the galley lift 100 without bending over. Thus, some embodiments of the galley lift 100 can be provided to reduce the risk of strains, cumulative trauma disorders ("CTDs"), and/or other types of injuries. According to the illustrated embodiment, the lift mechanism 406 can be located at a point that is substantially central to the base 402 (e.g., a center of the lift mechanism 406 can be located at a point that can be substantially equidistant from each of the four sides of the base 402). It should be understood that this example is illustrative, and therefore should not be construed as being limiting in any way.

The mounting plate 408 can be used to attach the lift mechanism 406 to the base 402. In some embodiments, the mounting plate 408 can be formed as a component of the lift mechanism 406, while in some other embodiments, the mounting plate 408 can be a separate part or structure that can be attached to the lift mechanism 406. In the illustrated embodiment, the mounting plate 408 is illustrated as being formed as a border around the piston 410. It should be understood that this example is illustrative, and therefore should not be construed as being limiting in any way.

The piston 410 can be used to generate a lift force for the lift mechanism 406. According to various embodiments of the concepts and technologies disclosed herein, the functionality of the piston 410 can be provided by a piston of a hydraulic jack, a piston of a bottle jack, a piston of a pneumatic jack, a worm gear, and/or another structure of a lift, jack, or other device configured to generate a lift force as described herein. Because various other devices and/or structure for generating the lift force described herein are possible and are contemplated, the above example embodiments of the piston 410 should not be construed as being limiting in any way.

The ram 412 can be actuated and/or moved by the piston 410, as is generally understood. Thus, a lift force that is generated by the piston 410 can be passed or translated by the piston 410 to the ram 412. The ram 412 can pass or translate the lift force to the lift platform 200 directly and/or via one or more other members (e.g., the lift platform ram extension 208). According to various embodiments of the concepts and technologies disclosed herein, multiple structures can be located between the piston 410 and the lift platform 200. As such, the illustrated embodiment is illustrative and should not be construed as being limiting in any way.

The actuator 414 can be used to actuate the piston 410. Thus, the actuator 414 can be used to actuate the piston 410 to generate the lift force as described herein. It should be understood that the illustrated embodiment of the lift mechanism 406, which is shown as including a foot pump or foot switch that can be used to operate the actuator 414, is illustrative and should not be construed as being limiting in any way. As noted above, however, the use of a foot pump or foot switch on the galley lift 100, whereby the lift mechanism 406 can be operated (or actuated) by a user without bending over, can help reduce the risk of strains, CTDs, and/or other types of injuries. In some other contemplated embodiments, the functionality of the actuator 414 can be provided by a handle, a turn screw, a pneumatic supply line (e.g., an air line that can be attached to a tank or compressor), a motor, a pump, and/or other devices, structures, and/or mechanisms that can be activated by one or more switches, valves, and/or other structures or devices. As such, the illustrated embodiment is illustrative of one contemplated example embodiment and should not be construed as being limiting in any way.

The release 416 can be included to release pressure from the piston 410. Thus, actuation of the release 416 can cause the piston 410 to release air pressure from inside the piston 410, thereby lowering the ram 412 and the upper portion 102. Thus, if a worm gear, pneumatic cylinder, or other type of device or structure is used in place of the piston 410, the release 416 can function in some other manner to lower the ram 412 and/or otherwise to release or reverse the lift force described herein. For example, if a worm gear is used to lift the ram 412, the release 416 can be used to reverse an applied force to the worm gear, thereby lowering the ram 412. In some embodiments, wherein a motor is used to lift the ram 412, the release 416 can reverse the motor. Additionally, or alternatively, a pneumatic cylinder can be used and a pneumatic pressure may be applied in one or both directions (e.g., a single acting or double acting pneumatic cylinder can be used), as generally is understood. It should be understood that the above example embodiments of the release 416 are illustrative and should not be construed as being limiting in any way.

The lower portion 104 also can include a ram extension 418. The ram extension 418 can be used to pass or translate the lift force generated by the piston 410 from the ram 412 to the upper portion 102 (e.g., to the lift platform ram extension 208). According to various embodiments of the concepts and technologies disclosed herein, an inner diameter of the ram extension 418 can be equal to or slightly larger than an outside diameter of the lift platform ram extension 208. Thus, in some embodiments, the lift platform ram extension 208 can be inserted into the ram extension 418 to join the lift platform ram extension 208 and the ram extension 418. In some other embodiments of the concepts and technologies disclosed herein, an outer diameter of the ram extension 418 can be equal to or slightly smaller than an inside diameter of the lift platform ram extension 208. Thus, in some embodiments, the ram extension 418 can be inserted into the lift platform ram extension 208 to join the lift platform ram extension 208 and the ram extension 418. In either or both configurations, a lift force applied to the ram 412 can pass through or be translated by the ram extension 418 and the lift platform ram extension 208 to lift the upper portion 102. It should be understood that this example is illustrative, and therefore should not be construed as being limiting in any way.

It similarly can be appreciated that the lift platform guides 206 and/or one more portions thereof can be inserted into the guide supports 404. In some embodiments, inner diameters of the guide supports 404 can be slightly larger than or equal to outer diameters of the lift platform guides 206 such that the lift platform guides 206 can nest into the guide supports 404 when the galley lift 100 is assembled from the upper portion 102 and the lower portion 104. In some other embodiments, outer diameters of the guide supports 404 can be slightly smaller than or equal to inner diameters of the lift platform guides 206 such that the guide supports 404 can nest into the lift platform guides 206 when the galley lift 100 is assembled from the upper portion 102 and the lower portion 104. In either case, the lift platform guides 206 can cooperate with the guide supports 404 to create the assembled configuration of the galley lift 100, in some embodiments. It should be understood that this example is illustrative, and therefore should not be construed as being limiting in any way.

The lower portion 104 also can include one or more floor support plate retention slots 420. The illustrated embodiment shows one floor support plate retention slot 420. It should be understood that this illustrated example embodiment is illustrative, and therefore should not be construed as being limiting in any way. Furthermore, it should be understood that the configuration of the floor support plate retention slot 420 is merely illustrative of the concepts and technologies disclosed herein and that other shapes and/or configurations of the floor support plate retention slot 420 are possible and are contemplated. According to various embodiments, the floor support plate retention slots 420 can be included, in some embodiments, to assist in retaining the floor support plates 108. In various embodiments of the concepts and technologies disclosed herein, one or more of the floor support plates 108 and the galley guide plate 110 can include one or more retention mechanisms 112. In the illustrated embodiment shown in FIG. 1, the retention mechanisms 112 are shown as keyhole-shaped apertures (e.g., an aperture, through hole, or slot that can have two or more diameters over two or more portions of the aperture, through hole, or slot). Because the retention mechanisms 112 can have other formats and/or configurations, it should be understood that this example is illustrative, and therefore should not be construed as being limiting in any way.

The retention mechanisms 112 can be included in some embodiments to hold one or more of the floor support plates 108 and/or the galley guide plate 110 to the galley lift 100. In the illustrated embodiment of the galley lift 100, the floor support plates 108 can be attached to the galley lift 100 by passing the retention mechanisms 112 (keyhole apertures in the illustrated embodiment) over one or more floor support plate retention mechanisms 422 that can be located, in some embodiments, on the guide 400 and/or elsewhere on the galley lift 100. Thus, it can be appreciated that the floor support plates 108 can be attached to the galley lift 100 via the floor support plate retention mechanisms 422 and located in the floor support plate retention slots 420. Thus, during movement of the galley lift 100, the floor support plates 108 may be located in a stowed position and maintained in the stowed position (relative to the galley lift 100) by the floor support plate retention slots 420 and the retention mechanisms 112. It should be understood that this example is illustrative, and therefore should not be construed as being limiting in any way.

The lower portion 104 also can include one or more weight distributor retention posts 424A-B (hereinafter collectively and/or generically referred to as "weight distributor retention posts 424"). When and/or if the components of the galley lift 100 are stowed (as will be illustrated and described below with reference to FIG. 5), an end of one of the weight distributors 106 can be slid through a respective one or more of the weight distributor apertures 426A-B (hereinafter collectively and/or generically referred to as "weight distributor apertures 426") that can be formed in the guide 400 and onto, around, or into a respective weight distributor retention post 424. The weight distributor retention posts 424 and the weight distributor apertures 426 can cooperate to hold the weight distributors 106 in place during movement of the galley lift 100. It should be understood that this example is illustrative, and therefore should not be construed as being limiting in any way.

According to various embodiments of the concepts and technologies disclosed herein, the weight distributor retention posts 424 can be configured as a post, projection, cube, or other structure that can be configured and/or dimensioned to nest inside the weight distributor 106 and/or a portion thereof, and/or to allow the weight distributor 106 to nest inside the weight distributor retention post 424. In the illustrated embodiment, where the weight distributor 106 can be configured as extruded aluminum having a substantially square cross-sectional shape (an example can be seen in FIG. 3), the weight distributor retention post 424 can be provided by a round or square peg or post that can enter into the void of the weight distributor 106 to prevent sliding and/or movement of the weight distributor 106 during movement of the galley lift 100. It should be understood that this example is illustrative, and therefore should not be construed as being limiting in any way.

The lower portion 104 also can include one or more casters, wheels, or other structures ("casters") 428A-C (hereinafter collectively and/or generically referred to as "casters 428"). In the illustrated embodiment, another caster 428 can be included at or near the bottom of the base 402, but that caster 428 is not visible in the view shown in FIG. 4 because the base 402 and/or other structure of the lower portion 104 is illustrated as obscuring the view of that corner of the lower portion 104. In some embodiments of the concepts and technologies disclosed herein, the functionality of the casters 428 can be provided by fixed or unfixed wheels or casters. In some embodiments, the wheels of the casters 428 are fixed in position and in some other embodiments the casters 428 can rotate or swivel. In the illustrated embodiment, the functionality of the casters 428 can be provided by three hundred sixty degree rotatable casters that can rotate into any direction. It can be appreciated that fixed wheels may result in easier movement of the galley lift 100 when lifting a heavy structure such as the galley (not shown in FIG. 4) relative to the rotatable casters used in various embodiments of the concepts and technologies disclosed herein, while rotatable and/or swiveling casters 428 (such as those shown in the FIGURES) can help maneuver the galley lift 100 before and/or after lifting a galley structure or other structure. According to various embodiments of the concepts and technologies disclosed herein, the casters 428 of the galley lift 100 may not be inflatable tires or wheels since inflatable tires or wheels may be difficult to maneuver, may deflate over time, and/or otherwise may be undesirable. Thus, the illustrated embodiment should be understood as being illustrative and should not be construed as being limiting in any way.

According to various embodiments of the concepts and technologies disclosed herein, the casters 428 can be formed as compact swiveling casters 428, thereby making the galley lift 100 easily maneuverable in various environments (e.g., in a restrictive and/or tight environment such as an aircraft interior or the like). In some embodiments, one or more (or all) of the wheels of the casters 428 can be formed from rubber, plastic, and/or other polymers. In some embodiments, wheels made from polymers such as hard rubber, hard plastic, or the like can be beneficial in that resistance during rolling may be reduced (relative to soft wheel materials) and therefore can reduce an amount of effort required from a user to move and/or maneuver the galley lift 100 when in use (e.g., when lifting a galley structure and/or other structure). It should be understood that this example is illustrative, and therefore should not be construed as being limiting in any way.

With collective reference now to FIGS. 1-4, some additional features of the galley lift 100 will be described in detail. In operation, a user or users can assemble the galley lift 100 from the upper portion 102 and the lower portion 104. In particular, during assembly of the galley lift 100, one or more portions of the one or more lift platform guides 206 and/or a portion of the lift platform ram extension 208 of the upper portion 102 can be aligned with the one or more of the guide supports 404 and/or the ram extension 418. In the illustrated embodiment, one or more portions of the one or more lift platform guides 206 can be inserted into one or more portions of the one or more guide supports 404, and one or more portion of the lift platform ram extension 208 can be inserted into one or more portion of the ram extension 418. Thus, the upper portion 102 can be assembled to the lower portion 104 to form the galley lift 100.

Although not visible in the FIGURES, it should be understood that locking mechanisms (e.g., apertures with pins or bolts, screws, straps, threads, and/or other structures, devices, or features) can be included to lock one or more of the lift platform guides 206 to the guide supports 404 and/or to lock the lift platform ram extension 208 to the ram extension 418. In one contemplated embodiment, one or more pin can be inserted through corresponding and aligned apertures formed in one or more of the lift platform guides 206 and one or more of the guide supports 404 to prevent unintended disassembly of the galley lift 100. In another contemplated embodiment, one or more pin can be inserted through one or more corresponding and aligned apertures formed in the lift platform ram extension 208 and the ram extension 418 to prevent unintended disassembly of the galley lift 100. It should be understood that this example is illustrative, and therefore should not be construed as being limiting in any way.

Although difficult to see in the FIGURES, it should be understood that fillets and/or chamfers can be used to reduce an effort required to assemble various components of the galley lift 100. For example, fillets or chamfers can be included on one or more of the ends of the lift platform guides 206 and/or the lift platform ram extension 208 to assist in inserting the lift platform guides 206 (or portions thereof) into the guide supports 404 (or portions thereof) and/or to assist in inserting the lift platform ram extension 208 (or a portion thereof) into the ram extension 418 (or a portion thereof). Additionally, or alternatively, fillets or chamfers can be included on one or more ends of the guide supports 404 and/or the ram extension 418 to assist in inserting the guide supports 404 (or portions thereof) and the ram extension 418 (or a portion thereof) into the lift platform guides 206 (or portions thereof) and the lift platform ram extension 208 (or a portion thereof). It should be understood that this example is illustrative, and therefore should not be construed as being limiting in any way.

Additionally, as mentioned above, the galley lift 100 can include structures to allow the floor support plates 108 to be stored, stowed, or otherwise located on or at a particular location, position, and/or configuration relative to the galley lift 100. In particular, to stow the floor support plates 108, the floor support plates 108 can be located with respect to the galley lift 100 such that one or more lower edges 114 or other portions of the one or more floor support plates 108 can rest in at least a portion of the one or more floor support plate retention slots 420. Similarly, retention mechanisms 112 of the floor support plates 108 can engage or be engaged by the floor support plate retention mechanism 422 (or other structures or devices), thereby retaining the floor support plates 108 in a stowed position. To use the floor support plates 108, the floor support plates 108 can be removed from the floor plate retention slot and the retention mechanisms 112. It should be understood that this example is illustrative, and therefore should not be construed as being limiting in any way.

Additionally, the weight distributors 106 can be stowed on or in the galley lift 100. In particular, in some embodiments of the galley lift 100, the weight distributors 106 or portions thereof can be inserted through respective weight distributor apertures 426 that can be formed in the guide 400. The weight distributors 106 can be arranged with respect to the weight distributor retention posts 424 such that one or more of the weight distributors 106 can be retained in a stowed position or at another location, positions, and/or configurations relative to the galley lift 100. To use the weight distributors 106, the weight distributors 106 can be removed (e.g., lifted up) off the weight distributor retention posts 424, out of the weight distributor apertures 426, and placed into a use position (e.g., placed on the weight distributor locators/anchors 214). It should be understood that this example is illustrative, and therefore should not be construed as being limiting in any way.

Additionally, the galley guide plate 110 can be stowed on and/or otherwise located at another location, position, and/or configuration relative to the galley lift 100. In particular, the retention mechanisms 112 of the galley guide plate 110 can be placed on the galley guide plate retention mechanisms 222, such that the galley guide plate 110 can be retained in a stowed position on the galley lift 100 and/or otherwise located at another location, position, and/or configuration relative to the galley lift 100. To use the galley guide plate 110, the galley guide plate 110 can be removed from the galley guide plate retention mechanisms 222. It should be understood that this example is illustrative, and therefore should not be construed as being limiting in any way.

Figure 5:
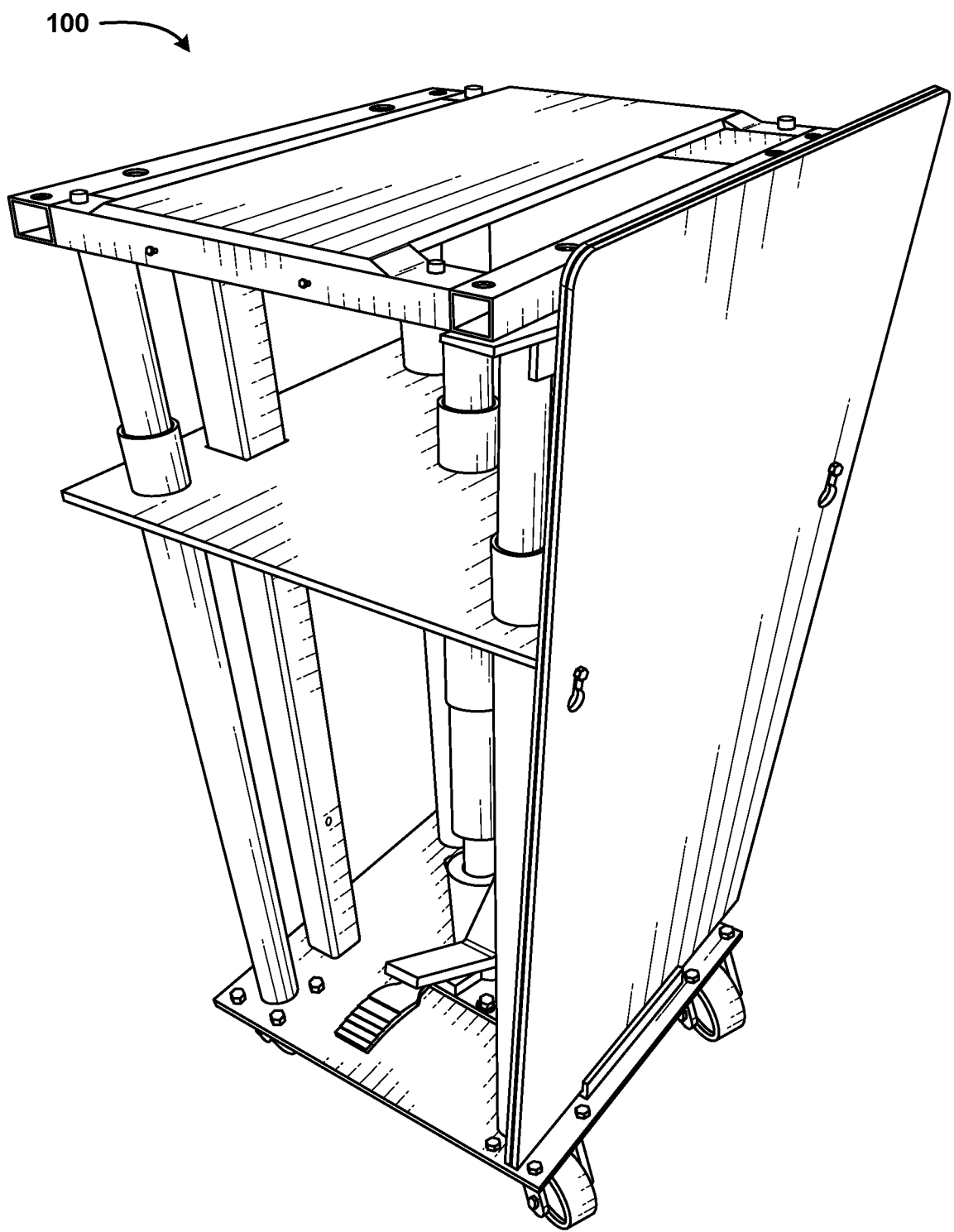
FIG. 5 is a line drawing showing a perspective view of a galley lift in a stowed configuration, according to an illustrative embodiment of the concepts and technologies disclosed herein.

Additional reference is made now to FIG. 5, which illustrates the galley lift 100 in a stow configuration. In FIG. 5, the galley guide plate 110 is not shown in its stowed location so as to avoid obscuring the other structure of the galley lift 100. The weight distributors 106 and the floor support plates 108, however, are shown in their stowed configuration. It can be appreciated from FIG. 5 that the stow configuration of the galley lift 100 can provide all of the components illustrated and described herein (e.g., the upper portion 102, the lower portion 104, the weight distributors 106, the floor support plates 108, the galley guide plates 110, and/or other components) in a unitary assembly. The galley lift 100 in the stow configuration can be moved by rolling, for example, thereby providing a convenient and compact assembly. Thus, some embodiments of the galley lift 100 in a stow configuration can be used to transport the various components of the galley lift 100. Because the stow configuration of the galley lift 100 can be used to provide other benefits and/or can be used for other purposes, it should be understood that this example is illustrative, and therefore should not be construed as being limiting in any way.

Figure 6:
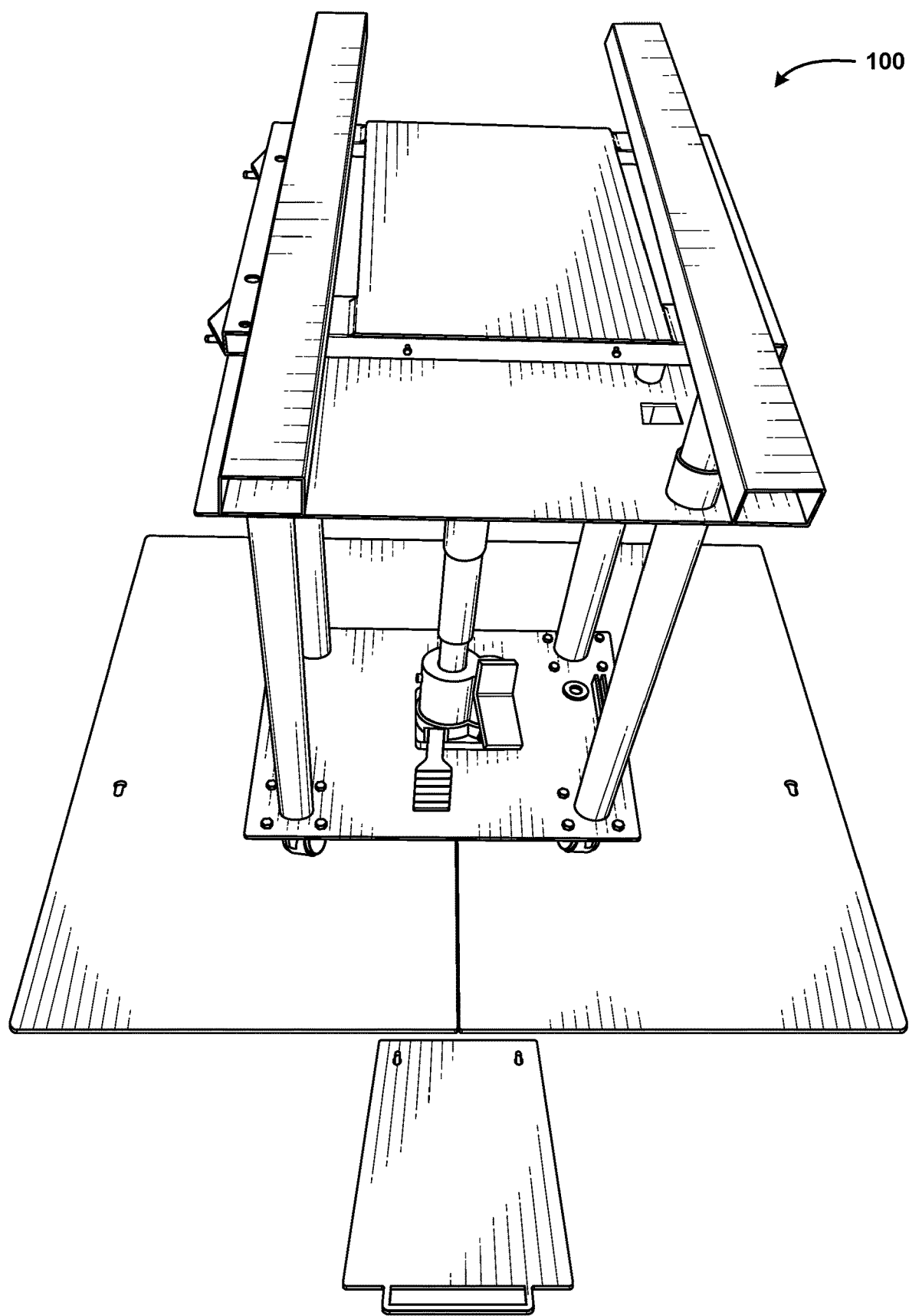
FIG. 6 is a line drawing showing a perspective view of a galley lift in a use configuration, according to an illustrative embodiment of the concepts and technologies disclosed herein.

Additional reference is now made to FIG. 6, which illustrates the galley lift 100 in a use configuration. The galley guide plate 110 is not shown stowed on the galley lift 100 in FIG. 6, but it should be understood that the galley guide plate 110 is not necessarily used in all embodiments of the galley lift 100. Also shown in FIG. 6, the floor support plates 108 are shown laying under the galley lift 100 (e.g., on a floor to support the galley lift 100 as will be explained in more detail below). While the galley guide plate 110 is shown positioned on the floor near the floor support plates 108, it should be understood that this is not necessarily the case. An example use of the galley guide plate 110 is explained below in more detail with reference to FIG. 8. It should be understood that this example is illustrative, and therefore should not be construed as being limiting in any way.

Figure 7:
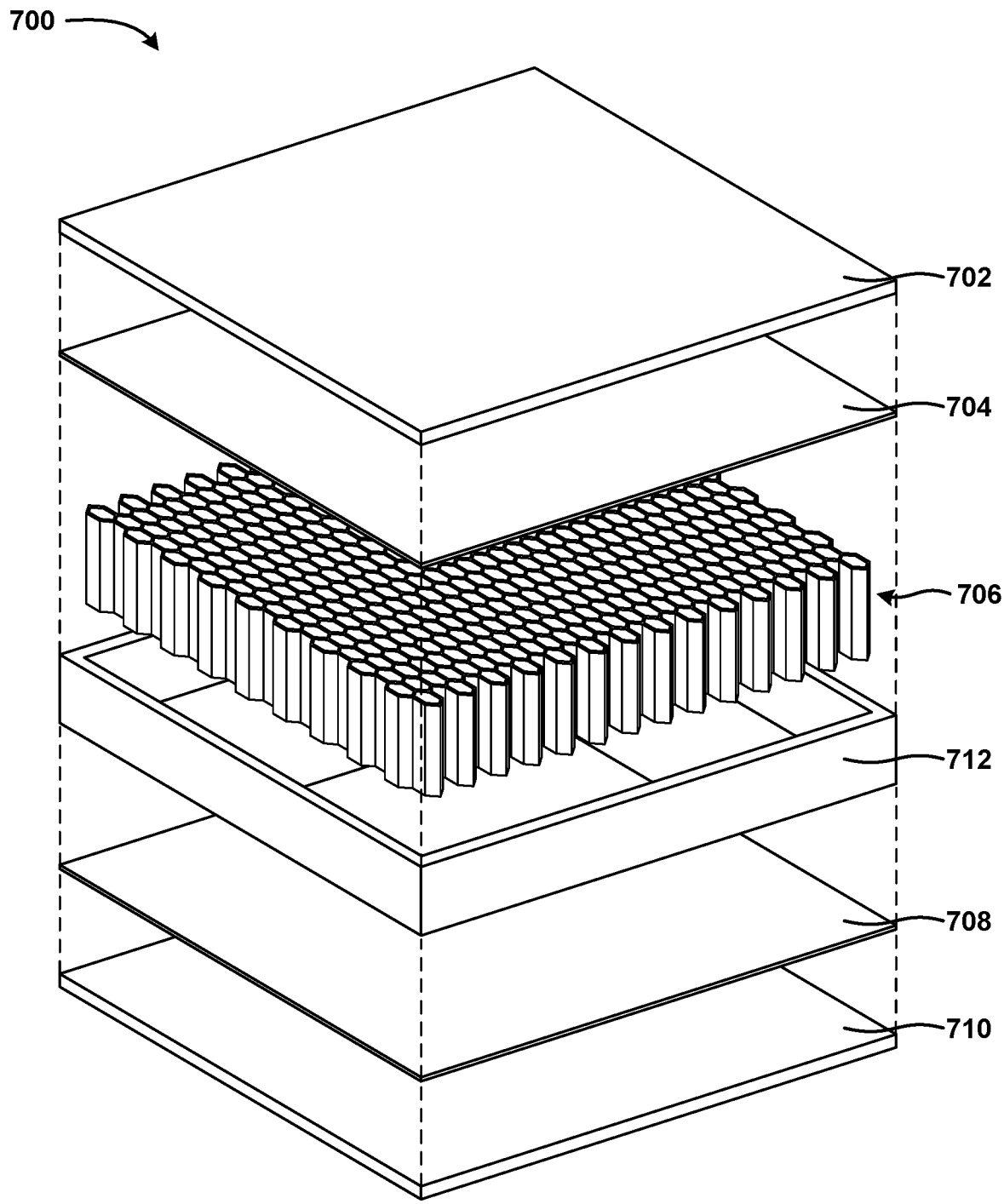
FIG. 7 is a line drawing illustrating an exploded assembly view of an aircraft floor panel, according to an illustrative embodiment of the concepts and technologies disclosed herein.

According to various embodiments of the concepts and technologies disclosed herein, the floor support plates 108 can be used to protect floor panels of an aircraft from being damaged by the galley lift 100. In particular, as shown in FIG. 7, an aircraft floor panel 700 can be formed from multiple components. In an example embodiment of an aircraft floor panel 700, the aircraft floor panel 700 can include one or more of an upper face sheet 702, an upper adhesive layer 704, a honeycomb structure 706, a lower adhesive layer 708, a lower face sheet 710, and an edge fill 712. Briefly, the honeycomb structure 706 can be used to provide structure for the aircraft floor panel 700 while reducing weight of the aircraft floor panel 700 relative to an embodiment in which a solid metal panel is substituted for the honeycomb structure 706. The honeycomb structure 706 can provide rigidity and strength (by way of requiring forces to travel through many side wall structures of the hexagonal or other polygonal-shaped structures) while having a large percentage of air space (thereby reducing weight of the honeycomb structure 706). It should be understood that this example is illustrative, and therefore should not be construed as being limiting in any way.

The upper face sheet 702 and the lower face sheet 710 can be attached to the honeycomb structure 706 by way of the upper adhesive layer 704 and the lower adhesive layer 708, respectively. Once assembled, some embodiments of the aircraft floor panel 700 include an edge fill 712 to seal and protect the honeycomb structure 706. It should be understood that this example is illustrative, and therefore should not be construed as being limiting in any way.

The aircraft floor panel 700 can be sufficiently rigid and/or structurally strong to support distributed weights (e.g., body weight over the surface area of a shoe or foot, etc.). The casters 428 of the galley lift 100, however, may exert a sufficient force during lifting of a galley or other aircraft component to cause the honeycomb structure 706 of the aircraft floor panel 700 to partially collapse, crumble, or otherwise fail.

To reduce or avoid this potential damage to the aircraft floor panel 700 or other aircraft structures, various embodiments of the concepts and technologies disclosed herein can include the use of the floor support plates 108. According to various implementations of the galley lift 100, the floor support plates 108 can be placed on the floor (e.g., on top of the aircraft floor panels 700 of an aircraft) during use of the galley lift 100, and the galley lift 100 can be rolled onto the floor support plates 108 before use (e.g., before applying a lifting force to a galley structure and/or other structure being lifted by the galley lift 100). The floor support plates 108 can be configured to distribute the weight and/or downward force from the casters 428, which can correspond to a) the galley lift 100, b) the weight of galley structure and/or other structure being lifted, and/or c) the perceived force required to break a seal between the aircraft and the galley structure and/or other structure being lifted across a large surface area of the aircraft floor panels 700. Thus, various embodiments of the concepts and technologies disclosed herein can be used to reduce or even eliminate the risk of a failure of one or more of the aircraft floor panels 700. It should be understood that this example is illustrative, and therefore should not be construed as being limiting in any way.

Figure 8:
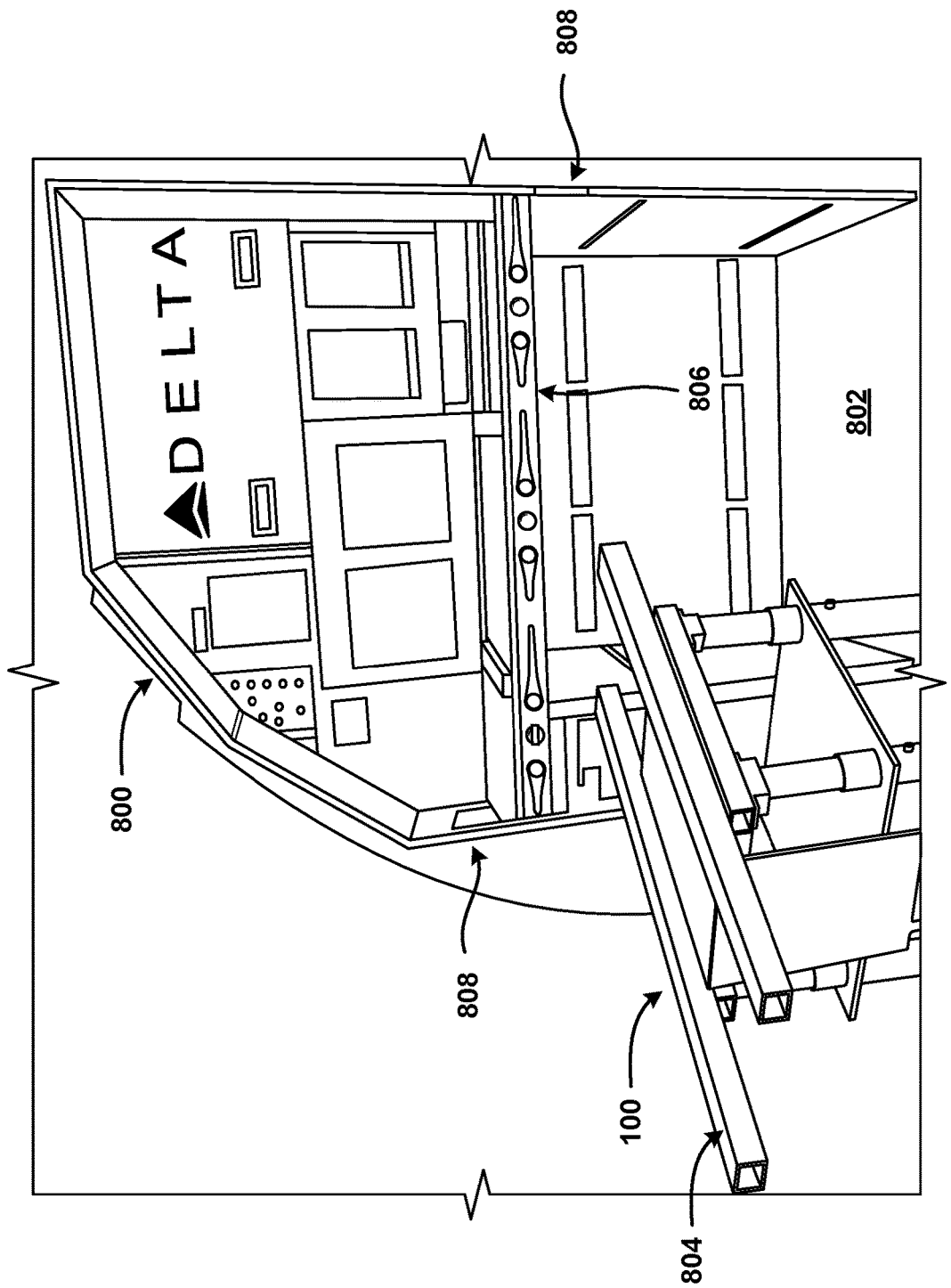
FIG. 8 is a line drawing illustrating a perspective view of an example operating environment for a galley lift, according to an illustrative embodiment of the concepts and technologies disclosed herein.

Turning now to FIG. 8, an example operating environment for the galley lift 100 is illustrated, according to one example embodiment. According to various embodiments of the concepts and technologies disclosed herein, the galley lift 100 can be used to lift an aircraft galley structure 800. The aircraft galley structure 800 sometimes may be lifted or moved within an aircraft for various reasons. For example, the aircraft galley structure 800 may be joined to the aircraft (e.g., attached to the aircraft floor 802 using an adhesive and/or mechanical fasteners) during a manufacturing process. At some time, for example during maintenance and/or modifications to the aircraft, the aircraft galley structure 800 may need to be moved to access wiring and/or other structures that may be behind, above, and/or under the aircraft galley structure 800; to check the aircraft galley structure 800 for corrosion and/or damage; to update or change aspects of the aircraft galley structure 800; and/or for other reasons. Thus, embodiments of the galley lift 100 can be used to lift the aircraft galley structure 800. Because the galley lift 100 may be used to lift the aircraft galley structure 800 at additional and/or alternative times, it should be understood that the above examples are illustrative, and therefore should not be construed as being limiting in any way.

As shown in FIG. 8, a top surface 804 of one or more of the weight distributors 106 of the galley lift 100 can be placed under a counter or surface 806 (or other support structure) of the aircraft galley structure 800. The galley lift 100 can be operated to apply a lift force to the bottom of the counter or surface 806, and the aircraft galley structure 800 can thereby be lifted by the galley lift 100. It should be understood that this example is illustrative, and therefore should not be construed as being limiting in any way.

Although not visible in FIG. 8, the floor support plates 108 can be laid on the aircraft floor 802 such that the casters 428 of the galley lift 100 are resting on the floor support plates 108 during application of the lifting force to lift the aircraft galley structure 800. Thus, the floor support plates 108 can be located between the aircraft floor 802 and the counter or surface 806 of the aircraft galley structure 800 during operation of the galley lift 100. It should be understood that this example is illustrative, and therefore should not be construed as being limiting in any way.

During lifting of the aircraft galley structure 800, the adhesive or other bonding material between the aircraft galley structure 800 and the aircraft floor 802 may be broken or otherwise caused to fail. The force required to cause the adhesive or other bonding material to fail, as well as the weight of the aircraft galley structure 800 itself, may exceed two hundred pounds, three hundred pounds, or even more. In one specific contemplated embodiment, the amount of force required to lift the aircraft galley structure 800 (including, but not necessarily limited to, the weight of the aircraft galley structure 800 and a force required to break a bond between the aircraft galley structure 800 and a floor of the aircraft) can be determined to be approximately two hundred eight five pounds.

The galley lift 100 can be configured to lift over one thousand pounds, two thousand pounds, or more in various embodiments, and therefore can be used to lift the aircraft galley structure 800 and/or to break the bond between the aircraft galley structure 800 and the aircraft. In some embodiments of the galley lift 100, the galley lift 100 can be used to lift the aircraft galley structure 800 and/or to break the bond between the aircraft galley structure 800 and the aircraft without requiring more than minimal manual effort. "Minimal manual effort" is used herein to refer to pumping the actuator 414 of the galley lift 100. It should be understood that this example is illustrative, and therefore should not be construed as being limiting in any way.

The galley guide plate 110 has been shown in multiple FIGURES and the function of the galley guide plate 110 will now be briefly described with reference to FIGS. 1 and 8. The galley guide plate 110 is illustrated has having a handle 116, though this is not necessarily the case and/or the handle 116 can have other configurations, shapes, positions, or the like. In the illustrated embodiment, the handle 116 can be used to provide leverage to a user of the galley guide plate 110, where the leverage can be applied to the galley guide plate 110 to urge the aircraft galley structure 800 in one or more directions. In particular, it can be appreciated that various embodiments of an aircraft galley structure 800 can be sized and dimensioned to fit into a location or structure in the aircraft with little room to spare on one or more sides of the aircraft galley structure 800. Thus, in some implementations of the galley lift 100, the aircraft galley structure 800 may catch on other structures, devices, or the like when moving the aircraft galley structure 800 out of connection with the aircraft using the galley lift 100.

Thus, various embodiments of the concepts and technologies disclosed herein can include the use of the galley guide plate 110 to provide a smooth surface along which the aircraft galley structure 800 can slide or be translated during movement to prevent damage to the aircraft and/or the aircraft galley structure 800, and/or to provide a surface via which the aircraft galley structure 800 can be urged and/or leveraged to move the aircraft galley structure 800 out of contact with other surfaces, devices, or the like. As shown in FIG. 8, the galley guide plate 110 can be inserted along one or more edges 808 of the aircraft galley structure 800 (between the aircraft galley structure 800 and a surface or device of the aircraft) for these and/or other purposes. The handle 116 can be used (e.g., by a user) to enable movement of the galley guide plate 110 to provide leverage for a user to assist in moving the aircraft galley structure 800 relative to the aircraft. It should be understood that this example is illustrative, and therefore should not be construed as being limiting in any way.

According to various embodiments of the concepts and technologies disclosed herein, the galley lift 100 can be formed from various materials and/or combinations of materials. In one embodiment, the majority of the components of the galley lift 100 (e.g., the majority measured in terms percent by volume and/or percent by weight) can be formed from one or more aluminum alloy. Aluminum alloys can be a preferred material for components of the galley lift 100 in some embodiments for one or more reasons. For example, aluminum alloys can be a preferred material for components of the galley lift 100 due to aluminum alloys generally being considered lightweight (densities of aluminum alloys are typically about one tenth of a pound per cubic inch; approximately two thousand seven hundred kilograms per cubic meter) relative to steel and/or some other metals, metal alloys, and/or other materials.

Additionally, or alternatively, aluminum alloys can be a preferred material for components of the galley lift 100 due to the relatively easy machinability of aluminum alloys relative to steel and/or some other metal alloys. For example, as a softer metal than steel or some other alloys, tooling for aluminum can be cheaper and may last longer than tools used to machine steel and/or some other metal alloys. Additionally, or alternatively, aluminum alloys can be a preferred material for components of the galley lift 100 due to the strength of many aluminum alloys (tensile strength of aluminum alloys typically range between four and seventy MPa) relative to some other materials (e.g., wood, polymers, or the like). Additionally, or alternatively, aluminum alloys can be a preferred material for components of the galley lift 100 because aluminum alloys may be less likely to damage aircraft structures and/or devices than steel and/or some other metal alloys. In some other contemplated embodiments, however, the galley lift 100 and/or some of its components may be formed from titanium, steel, copper, brass, and/or other metals and/or metal alloys; wood; carbon composite materials; polymers; and/or other materials.

In one embodiment of the galley lift 100, the frame members 204 of the lift platform 200 and the lift platform plate 210 may be formed from an aluminum alloy, and the lift platform guides 206 and the lift platform ram extension 208 can be formed from aluminum, steel, or other materials. The connection mechanisms 220 can be formed from steel, aluminum, or other materials. Thus, it can be appreciated that a majority of the upper portion 102 (in terms of volume and/or weight) may be formed from an aluminum alloy, in one embodiment. It should be understood that this example is illustrative, and therefore should not be construed as being limiting in any way.

In one embodiment of the galley lift 100, a majority of the lower portion 104 (in terms of weight or volume) can be formed from an aluminum alloy. In particular, the guide 400, the base 402, the guide supports 404, and the ram extension 418 can be formed from an aluminum alloy. In some other embodiments, the guide supports 404 and the ram extension 418 can be formed from steel or other materials. The lift mechanism 406 can be formed from steel or other materials, in some embodiments. The casters 428 can be formed from one or more of steel, other metals, rubbers or plastics, and/or other materials, as generally is understood. It should be understood that this example is illustrative, and therefore should not be construed as being limiting in any way.

According to various embodiments of the concepts and technologies disclosed herein, the floor support plates 108 can be formed from an aluminum alloy, from steel, from acrylics or other polymers, and/or from other materials. It should be understood that these examples are illustrative, and therefore should not be construed as being limiting in any way. According to some embodiments, the weight distributors 106 can be formed from extruded or otherwise formed aluminum alloy, from steel, and/or from other materials. It should be understood that these examples are illustrative, and therefore should not be construed as being limiting in any way. In some embodiments of the concepts and technologies disclosed herein, the galley guide plate 110 can be formed from an aluminum alloy, from steel, from acrylic or other polymers, and/or from other materials. It should be understood that these examples are illustrative, and therefore should not be construed as being limiting in any way.

While the various embodiments shown in the FIGURES do not show markings and/or coatings on the components of the galley lift 100, it should be understood that various embodiments of the concepts and technologies disclosed herein can include and/or can use paint, coatings, treatments, and/or other processes to provide texture, color, and/or otherwise to modify the appearance and/or characteristics of the materials used to form one or more components of the galley lift 100. In one contemplated embodiment of the concepts and technologies disclosed herein, anodization can be used to treat an aluminum alloy used to form some of the components of the galley lift 100 for various reasons such as, for example, to prevent oxidation, to prevent or reduce scratching, for aesthetic reasons, combinations thereof, or the like. Because anodization and/or other coatings, treatments, or the like can be included and/or used for additional and/or alternative reasons, it should be understood that the above examples are illustrative, and therefore should not be construed as being limiting in any way.

Although the FIGURES illustrate a galley lift 100 having a rectangular guide 400, base 402, and lift platform 200, it should be understood that other shapes are contemplated and are possible. In some contemplated embodiments of the concepts and technologies disclosed herein, one or more of the guide 400, the base 402, and the lift platform 200 can have a substantially cylindrical shape. In one such contemplated embodiment, four casters 428 can be located on the bottom of the base 402, and two guide supports 404 can interact with two lift platform guides 206 on the lift platform 200. This contemplated embodiment can have a lower weight than the illustrated embodiment, but can provide a substantially equivalent lifting capacity in some embodiments. Other shapes and/or form factors are possible and are contemplated (e.g., a triangular guide 400, base 402, and/or lift platform 200, where three guide supports 404 interact with lift platform guides 206). Because other shapes and/or form factors are possible and are contemplated, it should be understood that these example embodiments are illustrative and therefore should not be construed as being limiting in any way.

According to one implementation of the galley lift 100, the galley lift 100 can weigh approximately sixty pounds and the galley lift 100 can have a lifting capacity that can be over one thousand pounds. According to another implementation of the galley lift 100, the galley lift 100 can weigh approximately sixty pounds and the galley lift 100 can have a lifting capacity that can be over two thousand pounds. It should be understood that these examples are illustrative, and therefore should not be construed as being limiting in any way.

According to various embodiments of the concepts and technologies disclosed herein, other embodiments of the galley lift 100 can be formed with varying dimensions and/or proportions. For example, some embodiments of the galley lift 100 can be built with varying heights and/or adjustable heights to lift components and/or structures other than the aircraft galley structure 800 illustrated and described herein. Additionally, the galley lift 100 can be formed to have a capacity that can exceed the capacity of the illustrated embodiments of the galley lift 100 (the capacity of some of the illustrated embodiments can exceed one thousand pounds, two thousand pounds, or other capacities according to various embodiments).

According to some contemplated implementations of the concepts and technologies disclosed herein, an embodiment of the galley lift 100 can be used to transport and/or lift fixtures and/or molds, whereby the galley lift 100 can be transported to a desired location with the fixture or mold on the galley lift 100, and the galley lift can be raised (e.g., by applying a lift force using the actuator 414) until the level of the lift platform 200 matches a table or other surface onto which the fixture or mold is to be moved. This implementation can help a user avoid lifting the fixture or mold. It should be understood that this example is illustrative, and therefore should not be construed as being limiting in any way.

In some other implementations, the galley lift 100 can be used to transport material stock (e.g., metal, wooden, polymer or other material stock in the form of a bar or other configuration) from a rack or other structure to a machine or other location. In one contemplated implementation, a bar or rod of material stock can be rolled or slid onto the galley lift 100 from a storage location; the galley lift 100 can be rolled to a saw, press, or other machine; the galley lift can be raised (e.g., by applying a lift force using the actuator 414) to match a saw, press, or other machine height; the bar or rod of material stock can be rolled or slid onto the saw, press, or other machine for cutting or some other operation; the remaining bar or rod of material stock can be rolled or slid back onto the galley lift 100; and the galley lift 100 with the remaining bar or rod of material stock can be returned to the storage location. The galley lift 100 also can be used to support long parts during machining and/or other processes. It should be understood that these examples are illustrative, and therefore should not be construed as being limiting in any way.

Turning now to FIGS. 9A-9I, additional features of the galley lift 100 in some embodiments will be described via reference to photos depicting an example use of the galley lift 100, according to an example embodiment of the concepts and technologies disclosed herein. It should be understood that the aircraft galley structure 800 shown in FIGS. 9A-9I is illustrative of one example embodiment of an aircraft galley structure 800 and therefore should not be construed as being limiting in any way. Additionally, the galley lift 100 shown in FIGS. 9A-9I is one example embodiment of the galley lift 100 and should not be construed as being limiting in any way.

As shown in FIGS. 9A-9D, the galley lift 100 can be moved into position with respect to the aircraft galley structure 800. As explained above, the galley lift 100 can be placed under the counter or surface 806 or other support surface of the aircraft galley structure 800. As is visible in FIG. 9A, one or more pieces of foam rubber, plastic, paint, coatings, or other material or treatments such as a non-slip material (hereinafter referred to as "non-slip material") 900 can be disposed to one or more surfaces of the galley lift 100 (e.g., one or more top surface 804 of one or more of the weight distributors 106 and/or other surfaces) to protect the aircraft galley structure 800 during lifting, to prevent slippage and/or shifting of the aircraft galley structure 800 during lifting, and/or for other purposes including aesthetics. It should be understood that this example is illustrative, and therefore should not be construed as being limiting in any way.

Figure 9A:
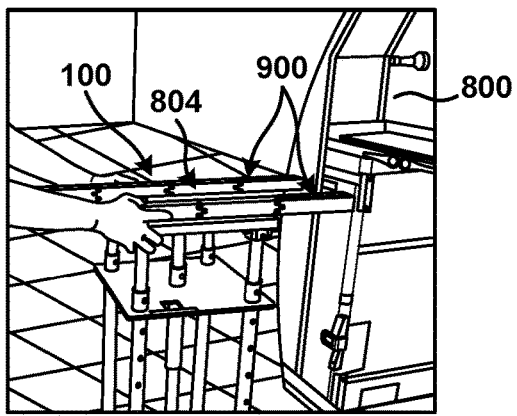
FIGS. 9A-9I are photographs illustrating an example use of the galley lift, according to an illustrative embodiment of the concepts and technologies disclosed herein.
Figure 9B:
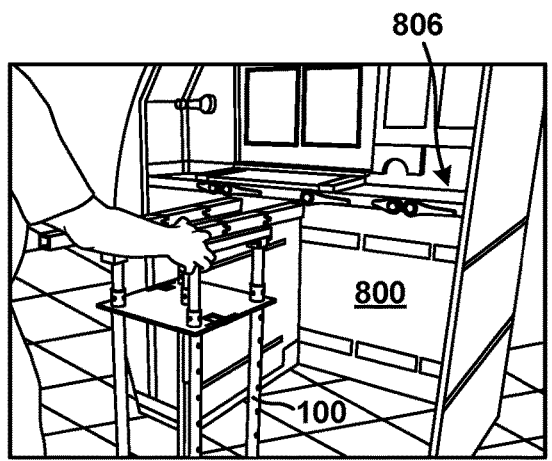
Figure 9C:
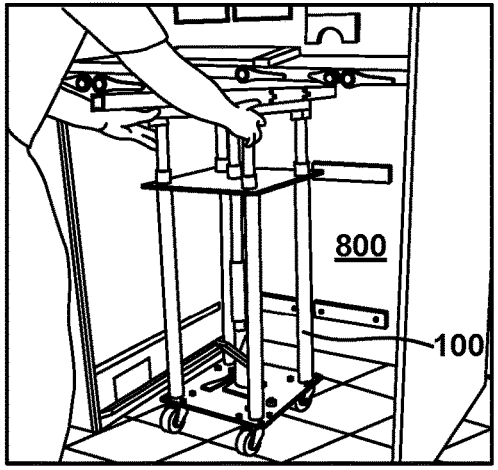
Figure 9D:
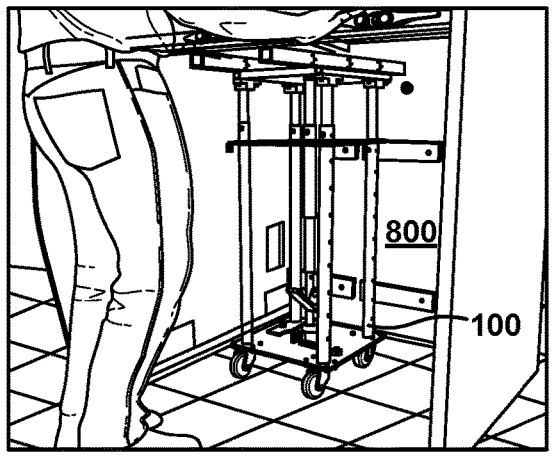

As shown in FIG. 9D, the galley lift 100 can be placed such that the weight distributors 106 are located under the counter or surface 806 or other support surface or structure of the aircraft galley structure 800, though this is not necessarily the case in all implementations of the galley lift 100. As can be appreciated with reference to FIG. 9D, a user or operator of the galley lift 100 need not go under the aircraft galley structure 800 or otherwise bend over at any point during a lifting operation using the galley lift 100, according to some embodiments. As such, the galley lift 100 can correspond to an ergonomic galley lift, in various embodiments of the concepts and technologies disclosed herein. It should be understood that this example is illustrative, and therefore should not be construed as being limiting in any way.

Figure 9E:
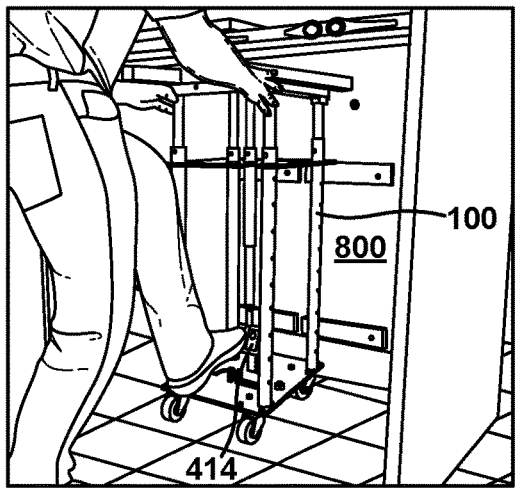
Figure 9F:
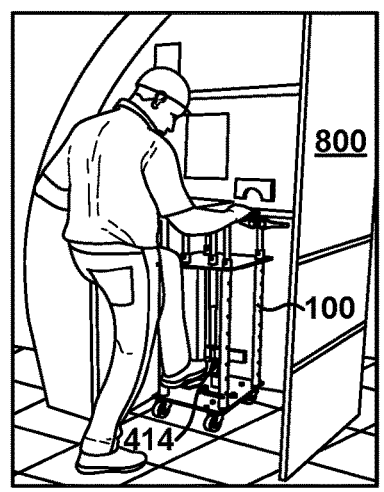
Figure 9G:
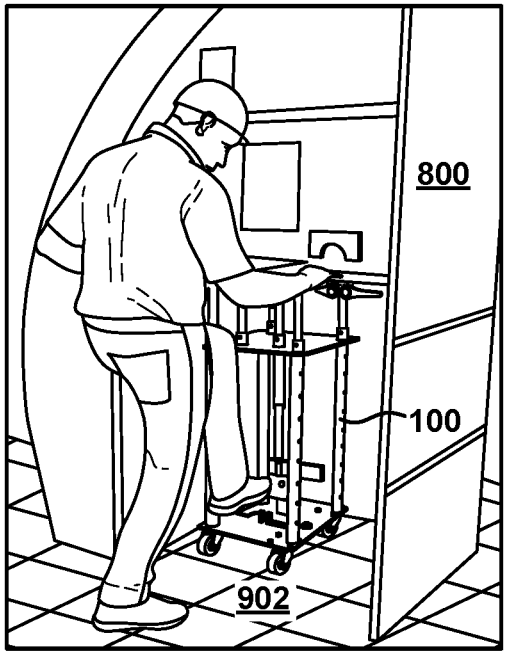

As shown in FIGS. 9E-9G, a user, motor, pneumatic force, or other force can act on the actuator 414 to create a lift force using the galley lift 100. As can be appreciated with reference to FIGS. 9E-9G, a user can actuate the actuator 414 using a foot. It can be appreciated with reference to FIGS. 9E-9G, that the user can actuate the actuator 414 without bending over and/or going under the aircraft galley structure 800 at any point during the lifting operation using the galley lift 100. As such, the galley lift 100 can correspond to an ergonomic galley lift for another reason, in various embodiments of the concepts and technologies disclosed herein. It should be understood that this example is illustrative, and therefore should not be construed as being limiting in any way.

Figure 9H:
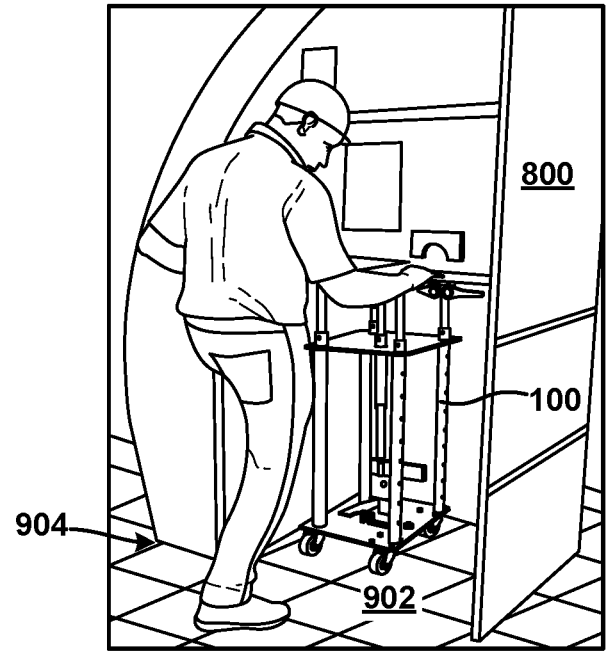
Figure 9I:

As shown in FIG. 9H, the aircraft galley structure 800 can be lifted off the floor or ground 902 by the galley lift 100 as can be seen by referring to the gap generally indicated at 904 in FIG. 9H. As noted above, the floor support plates 108 can be located under the galley lift 100 in some embodiments, though this is not shown in FIGS. 9A-9I. As shown in FIG. 9I, the aircraft galley structure 800 can be moved while on the galley lift 100 (including rotating and/or moving as shown in FIG. 9I). Because the casters 428 can be configured to swivel in any direction about an axis, the aircraft galley structure 800 can be moved in substantially any direction, according to various embodiments of the concepts and technologies disclosed herein. It should be understood that this example use of the galley lift 100 is illustrative, and therefore should not be construed as being limiting in any way.

Figure 10:
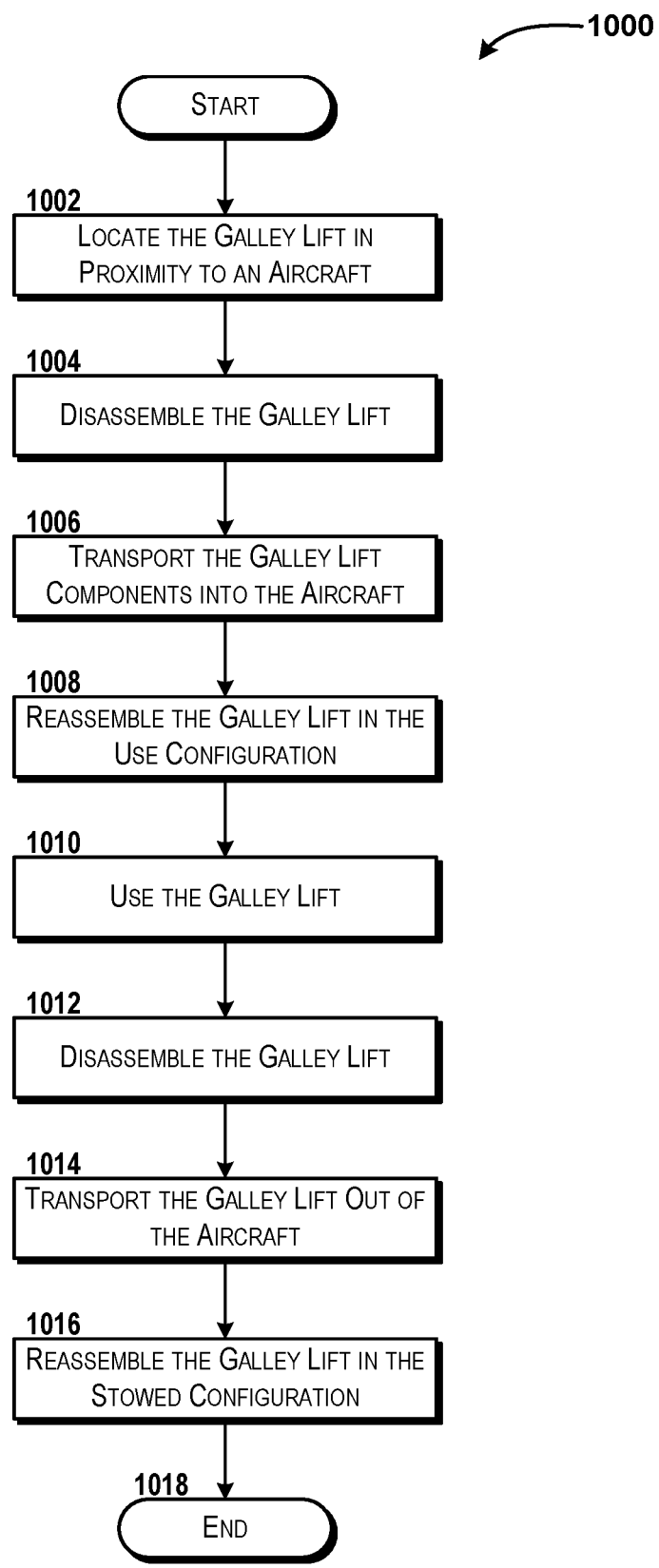
FIG. 10 is a flow diagram showing aspects of a method for using a galley lift, according to an illustrative embodiment of the concepts and technologies described herein.

Turning now to FIG. 10, aspects of a method 1000 for using a galley lift 100 will be described in detail, according to an illustrative embodiment. It should be understood that the operations of the method 1000 disclosed herein are not necessarily presented in any particular order and that performance of some or all of the operations in an alternative order(s) is possible and is contemplated. The operations of the method 1000 have been presented in the demonstrated order for ease of description and illustration. Operations of the method 1000 may be added, omitted, and/or performed simultaneously, without departing from the scope of the concepts and technologies disclosed herein.

The method 1000 can begin at operation 1002. At operation 1002, the galley lift 100 can be moved into proximity of the aircraft in which the galley lift 100 is to be used. In some embodiments, the galley lift 100 can be rolled or otherwise moved to a location that is proximate to a door or other entry or exit of the aircraft. In some other embodiments, the galley lift 100 can be rolled or otherwise moved to a location that is proximate to stairs or a ramp that extends to or near the door or other entry or exit of the aircraft. In some embodiments, the galley lift 100 can be configured in a stowed configuration when moved to a location that is proximate to the aircraft. It should be understood that this example is illustrative, and therefore should not be construed as being limiting in any way.

From operation 1002, the method 1000 can proceed to operation 1004. At operation 1004, the galley lift 100 can be disassembled. In particular, the upper portion 102 can be separated from the lower portion 104. Additionally, the weight distributors 106 can be, but are not necessarily, removed from their storage or stowed position on the galley lift 100. Additionally, the floor support plates 108 can be removed from their storage or stowed position on the galley lift 100. Additionally, the galley guide plate 110 can be removed from its storage or stowed position on the galley lift 100.

From operation 1004, the method 1000 can proceed to operation 1006. At operation 1006, the components of the galley lift 100 can be transported into the aircraft. In some embodiments, one or more of the components of the galley lift 100 can be carried into the aircraft. In some other embodiments, one or more of the components of the galley lift 100 can be rolled into the aircraft. According to various embodiments of the concepts and technologies disclosed herein, each of the components of the galley lift 100 transported into the aircraft can weigh less than thirty pounds and/or optionally less than twenty five pounds. It should be understood that these embodiments are illustrative, and therefore should not be construed as being limiting in any way.

From operation 1006, the method 1000 can proceed to operation 1008. At operation 1008, the components of the galley lift 100 can be reassembled to form or otherwise obtain the galley lift 100 in a use configuration. In some embodiments, the upper portion 102 can be connected to the lower portion 104. The weight distributors 106 can be attached to or placed on the upper portion in their use position as illustrated and described herein (e.g., the weight distributors 106 can be located such that one or more of the weight distributor locator/anchor apertures 300 can engage one or more of the weight distributor locators/anchors 214).

The floor support plates 108 can be placed on the floor of the aircraft at the location at which the galley lift 100 is to be located. For example, the floor support plates 108 can be placed under the aircraft galley structure 800 if the aircraft galley structure 800 is to be moved or lifted by the galley lift 100. According to various embodiments of the concepts and technologies disclosed herein, the galley guide plate 110 may be attached to the galley guide plate retention mechanisms 222 on the upper portion 102 (or lower portion 104). Thus, in operation 1008, the galley lift 100 can be configured in the use configuration. It should be understood that this example is illustrative, and therefore should not be construed as being limiting in any way.

From operation 1008, the method 1000 can proceed to operation 1010. At operation 1010, the galley lift 100 can be used in the manufacture of an aircraft, in the maintenance of an aircraft, in the modification of an aircraft, and/or for other purposes. From operation 1010, the method 1000 can proceed to operation 1012. At operation 1012, the galley lift 100 can be disassembled. In particular, the upper portion 102 can be separated from the lower portion 104, and the weight distributors 106 can be removed from the upper portion 102.

From operation 1012, the method 1000 can proceed to operation 1014. At operation 1014, the components of the galley lift 100 can be removed from the aircraft. In some embodiments, one or more of the components of the galley lift 100 can be carried out of the aircraft. In some other embodiments, one or more of the components of the galley lift 100 can be rolled out of the aircraft. The components of the galley lift 100 can be located at or near the aircraft (if desired) or elsewhere.

From operation 1014, the method 1000 can proceed to operation 1016. At operation 1016, the galley lift 100 can be reassembled in the stowed configuration. In some embodiments, the upper portion 102 can be connected to the lower portion 104. The weight distributors 106 can be placed into and through respective weight distributor apertures 426 in the guide 400 and located on respective weight distributor retention posts 424 on the base 402. Lower edges 114 of the floor support plates 108 can be placed into the floor support plate retention slot 420 and the retention mechanisms 112 of the floor support plates 108 can be located on the floor support plate retention mechanisms 422 on the guide 400. The retention mechanisms 112 of the galley guide plate 110 can be placed on the galley guide plate retention mechanisms 222 on the upper portion 102. Thus, the galley lift 100 can be in the stowage configuration.

From operation 1016, the method 1000 can proceed to operation 1018. The method 1000 can end at operation 1018.

Based on the foregoing, it can be appreciated that a galley lift has been disclosed herein. Although the subject matter presented herein has been described with respect to various structural features and/or methodological and transformative acts for forming the galley lift and/or the various features thereof, it is to be understood that the concepts and technologies disclosed herein are not necessarily limited to the specific features or acts described herein. Rather, the specific features and acts are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A galley lift comprising:
an upper portion comprising a lift platform, a lift platform ram extension that is connected to the lift platform, and a lift platform guide that is connected to the lift platform;
a lower portion having a base, a guide support having a first end that is connected to the base, and a lift mechanism attached to the base, the lift mechanism comprising a ram, wherein the lift platform guide is configured to be joined to the guide support, and wherein the lift platform ram extension is configured to be joined to the ram; and
a weight distributor that is configured to engage a top surface of the lift platform and to contact an aircraft galley structure during lifting of the aircraft galley structure.

2. The galley lift of claim 1, further comprising a guide that is connected to a second end of the guide support.

3. The galley lift of claim 2, wherein the guide comprises a weight distributor aperture into which a portion of the weight distributor is passed to stow the weight distributor.

4. The galley lift of claim 3, further comprising a weight distributor retention post located on the base, wherein the weight distributor is configured to engage the weight distributor retention post to stow the weight distributor.

5. The galley lift of claim 1, wherein the lift platform comprises:
a lift platform frame; and
a lift platform plate.

6. The galley lift of claim 1, wherein the lift mechanism comprises a hydraulic jack.

7. The galley lift of claim 6, wherein the lift mechanism comprises an actuator that is actuated by a foot switch.

8. The galley lift of claim 1, wherein the upper portion comprises a plurality of lift platform guides comprising the lift platform guide, wherein the lower portion comprises a plurality of guide supports comprising the guide support.

9. A galley lift comprising:
an upper portion comprising a lift platform, a lift platform ram extension that is connected to the lift platform, and a lift platform guide that is connected to the lift platform;
a lower portion having a base, a guide support having a first end that is connected to the base, and a lift mechanism attached to the base, the lift mechanism comprising a ram, wherein the lift platform guide is configured to be joined to the guide support, and wherein the lift platform ram extension is configured to be joined to the ram; and
a weight distributor that is configured to engage a portion of the upper portion and to contact an aircraft galley structure during lifting of the aircraft galley structure.

10. The galley lift of claim 9, wherein the lift mechanism comprises a hydraulic jack.

11. The galley lift of claim 10, wherein the lift mechanism comprises an actuator that is actuated by a foot switch to raise the lift platform, and wherein the lift mechanism further comprises a release to lower the lift platform.

12. A galley lift comprising:
an upper portion comprising a lift platform, a lift platform ram extension that is connected to the lift platform, and a lift platform guide that is connected to the lift platform;
a lower portion having a base, a guide support having a first end that is connected to the base, and a lift mechanism attached to the base, the lift mechanism comprising a ram, wherein the lift platform guide is configured to be joined to the guide support, and wherein the lift platform ram extension is configured to be joined to the ram;

a weight distributor, wherein a first side of the weight distributor is configured to engage a portion of the lift platform, and wherein a second side of the weight distributor is configured to contact an aircraft galley structure during lifting of the aircraft galley structure; and a floor support plate that is configured to be stowed by engaging a floor support plate retention slot located on the base.

13. The galley lift of claim 12, wherein the lift platform comprises:

a lift platform frame; and a lift platform plate.

14. The galley lift of claim 13, wherein a weight distributor slot is located between a first edge of the lift platform plate and the lift platform frame.

15. The galley lift of claim 12, further comprising:

a guide that is connected to a second end of the guide support.

16. The galley lift of claim 15, wherein the guide comprises a weight distributor aperture into which a portion of the weight distributor is passed to stow the weight distributor.

17. The galley lift of claim 15, further comprising:

a floor support plate retention mechanism located on the guide.

18. The galley lift of claim 12, further comprising a weight distributor retention post located on the base, wherein the weight distributor is configured to engage the weight distributor retention post to stow the weight distributor.

19. The galley lift of claim 12, wherein the lift mechanism comprises a hydraulic jack.

20. The galley lift of claim 19, wherein the lift mechanism comprises an actuator that is actuated by a foot switch to raise the lift platform, and wherein the lift mechanism further comprises a release to lower the lift platform.

* * * * *